United States Patent
Gui et al.

(10) Patent No.: US 6,212,042 B1
(45) Date of Patent: Apr. 3, 2001

(54) SLIDER HAVING AIR BEARING SURFACE WHICH INCLUDES PADS FOR DISK STORAGE SYSTEM

(75) Inventors: Jing Gui, Fremont; Bruno J. Marchon, Palo Alto, both of CA (US); Daniel P. Burbank, Minneapolis, MN (US); Joel W. Hoehn, Cottage Grove, MN (US); Jeffery K. Berkowitz, Carver, MN (US); Ramesh Sundaram, Fremont, CA (US); John L. Brand, Burnsville, MN (US); Subrahmanyan Nagarajan, Burnsville, MN (US); Dallas W. Meyer; Peter R. Segar, both of Burnsville, MN (US); Andreas A. Polycarpou, Eden Prairie, MN (US); Zine-Eddine Boutaghou, Vadnais Heights, MN (US); Dale E. Egbert, Deephaven, MN (US); David G. Wobbe, Shakopee, MN (US); Mary Cynthia Hipwell, Minneapolis, MN (US); Huan Tang, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/029,276
(22) PCT Filed: Feb. 25, 1998
(86) PCT No.: PCT/US98/03722
  § 371 Date: Dec. 9, 1998
  § 102(e) Date: Dec. 9, 1998
(87) PCT Pub. No.: WO99/00792
  PCT Pub. Date: Jan. 7, 1999

Related U.S. Application Data

(60) Provisional application No. 60/074,958, filed on Feb. 17, 1998, provisional application No. 60/067,590, filed on Dec. 5, 1997, provisional application No. 60/064,791, filed on Nov. 10, 1997, provisional application No. 60/064,789, filed on Nov. 10, 1997, provisional application No. 60/064,785, filed on Nov. 10, 1997, provisional application No. 60/064,949, filed on Nov. 7, 1997, provisional application No. 60/055,899, filed on Aug. 15, 1997, provisional application No. 60/054,313, filed on Jul. 31, 1997, provisional application No. 60/051,044, filed on Jun. 27, 1997, and provisional application No. 60/051,043, filed on Jun. 27, 1997.

(51) Int. Cl.[7] ............................................... G11B 5/60
(52) U.S. Cl. ......................... 360/236.6; 360/235.2; 360/236.8; 360/237; 360/237.1; 360/234.1
(58) Field of Search .................... 360/103, 234.1, 360/235.4, 235.8, 236.8, 236.6, 237, 237.1, 235.2

(56) References Cited

U.S. PATENT DOCUMENTS

| 3,754,104 | 8/1973 | Piper et al. | ............... 179/100.2 |
| 4,034,412 | 7/1977 | Smith | ............... 360/103 |
| 4,327,387 | 4/1982 | Plotto | ............... 360/103 |

(List continued on next page.)

FOREIGN PATENT DOCUMENTS 0 442 660 A2   8/1991   (EP) .

(List continued on next page.)

OTHER PUBLICATIONS

Technical Disclosure Bulletin, "Magnetic Disk Storage System With Structured Magnetic Head Slider", by IBM Corp., vol. 27, No. 10A, (Mar. 1985) pp. 5820–5821.

(List continued on next page.)

Primary Examiner—Jefferson Evans
(74) Attorney, Agent, or Firm—Westman, Champlin & Kelly, P.A.

(57) ABSTRACT

A disc storage system includes a rotating disc and a transducer. The transducer is carried on a slider which is supported by an armature. The armature is used to move the slider radially across the disc surface whereby information may be read from or written to the disc surface of the transducer. The slider includes an air bearing surface which faces the disc surface. As the disc rotates, the air bearing surface causes the slider to "fly" over the disc surface. Pads are provided on the air bearing surface to improve operational characteristics of the system.

158 Claims, 16 Drawing Sheets

U.S. PATENT DOCUMENTS

| | | |
|---|---|---|
| 54-23517 | 2/1979 | (JP) . |
| 56-107363 | 8/1981 | (JP) . |
| 4,692,832 | 9/1987 | Bandara et al. ............ 360/137 |
| 4,757,402 | 7/1988 | Mo ............................... 360/103 |
| 4,853,810 | 8/1989 | Pohl et al. ................... 360/103 |
| 4,893,204 * | 1/1990 | Yamada et al. .............. 360/103 |
| 4,901,185 | 2/1990 | Kubo et al. .................. 360/104 |
| 5,010,429 | 4/1991 | Taguchi et al. .............. 360/103 |
| 5,012,572 | 5/1991 | Matsuzawa et al. ......... 29/603 |
| 5,020,213 | 6/1991 | Aronoff et al. .............. 29/603 |
| 5,034,828 | 7/1991 | Ananth et al. ............... 360/75 |
| 5,052,099 | 10/1991 | Taguchi et al. .............. 29/603 |
| 5,063,712 | 11/1991 | Hamilton et al. ............ 51/67 |
| 5,067,037 | 11/1991 | Ananth et al. ............... 360/103 |
| 5,079,657 | 1/1992 | Aronoff et al. .............. 360/103 |
| 5,162,073 | 11/1992 | Aronoff et al. .............. 156/625 |
| 5,200,867 | 4/1993 | Albrecht et al. ............. 360/103 |
| 5,202,803 | 4/1993 | Albrecht et al. ............. 360/97.02 |
| 5,267,104 | 11/1993 | Albrecht et al. ............. 360/97.02 |
| 5,285,337 | 2/1994 | Best et al. .................... 360/97.02 |
| 5,323,282 | 6/1994 | Kanai et al. .................. 360/103 |
| 5,345,353 | 9/1994 | Krantz et al. ................ 360/103 |
| 5,374,463 | 12/1994 | Bethune et al. .............. 428/64 |
| 5,386,666 | 2/1995 | Cole .............................. 451/5 |
| 5,388,020 | 2/1995 | Nakamura et al. .......... 360/135 |
| 5,396,386 | 3/1995 | Bolasna et al. .............. 360/103 |
| 5,396,387 | 3/1995 | Murray ......................... 360/103 |
| 5,418,667 | 5/1995 | Best et al. .................... 360/103 |
| 5,420,735 | 5/1995 | Haines .......................... 360/103 |
| 5,424,888 | 6/1995 | Hendriks et al. ............ 360/103 |
| 5,453,315 | 9/1995 | Hamilton et al. ............ 428/209 |
| 5,490,027 | 2/1996 | Hamilton et al. ............ 360/104 |
| 5,499,149 | 3/1996 | Dovek .......................... 360/103 |
| 5,508,861 | 4/1996 | Ananth et al. ............... 360/103 |
| 5,515,219 * | 5/1996 | Ihrke et al. ................... 360/103 |
| 5,526,204 | 6/1996 | French et al. ................ 360/97.02 |
| 5,537,273 | 7/1996 | Hendriks et al. ............ 360/103 |
| 5,550,691 | 8/1996 | Hamiton ...................... 360/103 |
| 5,550,693 | 8/1996 | Hendriks et al. ............ 360/103 |
| 5,550,696 | 8/1996 | Nguyen ........................ 360/135 |
| 5,557,488 | 9/1996 | Hamilton et al. ............ 360/104 |
| 5,569,506 | 10/1996 | Jahnes et al. ................. 428/65.3 |
| 5,572,386 | 11/1996 | Ananth et al. ............... 360/103 |
| 5,606,476 | 2/1997 | Chang et al. ................. 360/103 |
| 5,612,838 | 3/1997 | Smith et al. .................. 360/102 |
| 5,625,512 | 4/1997 | Smith ............................ 360/103 |
| 5,626,941 | 5/1997 | Ouano .......................... 428/141 |
| 5,768,055 * | 6/1998 | Tian et al. .................... 360/103 |
| 5,774,303 * | 6/1998 | Teng et al. ................... 360/103 |
| 5,815,346 * | 9/1998 | Kimmal et al. .............. 360/103 |
| 5,841,608 * | 11/1998 | Kasamatsu et al. ......... 360/103 |
| 5,864,452 * | 1/1999 | Hirano et al. ................ 360/122 |
| 5,870,251 * | 2/1999 | Boutaghou .................. 360/103 |
| 5,872,686 * | 2/1999 | Dorius et al. ................ 360/103 |
| 5,886,856 * | 3/1999 | Tokuyama et al. .......... 360/103 |
| 5,991,118 * | 11/1999 | Kasamatsu et al. ......... 360/103 |
| 5,994,035 * | 11/1999 | Tsukamoto et al. ......... 430/320 |
| 6,040,958 * | 3/2000 | Yamamoto et al. ......... 360/103 |

FOREIGN PATENT DOCUMENTS

| | | |
|---|---|---|
| 58-66995 | 4/1983 | (JP) . |
| 59-193580 | 11/1984 | (JP) . |
| 4-245054 | 9/1992 | (JP) . |
| 8-069674 | 3/1996 | (JP) . |
| 8-69674 | 3/1996 | (JP) . |
| 8-212740 | 8/1996 | (JP) . |
| 8-279132 | 10/1996 | (JP) . |
| 8-287440 | 11/1996 | (JP) . |

OTHER PUBLICATIONS

"Stiction Free Slider for the Smooth Surface Disk", by Y. Kasamatsu et al., *IEEE Transactions on Magnetics*, vol. 31, No. 6, (Nov. 1995), pp. 2961–2963.

"A Stiction Model for a Head–Disk Interface of a Rigid Disk Drive", by J. Gui et al., *J. Appl. Phys.*, vol. 78, No. 6, (Sep. 15, 1995), pp. 4206–4217.

"A Model for Mechanical Seals with Regular Microsurface Structure", by I. Etsion et al., *Tribology Transactions*, vol. 39, (1996), pp. 677–683.

"Increasing Mechanical Seals Life With Laser–Textured Seal Faces", by G. Halperin et al., *Surface Surtech Technologies Ltd.*, (Sep. 1997), pp. 1–12.

* cited by examiner

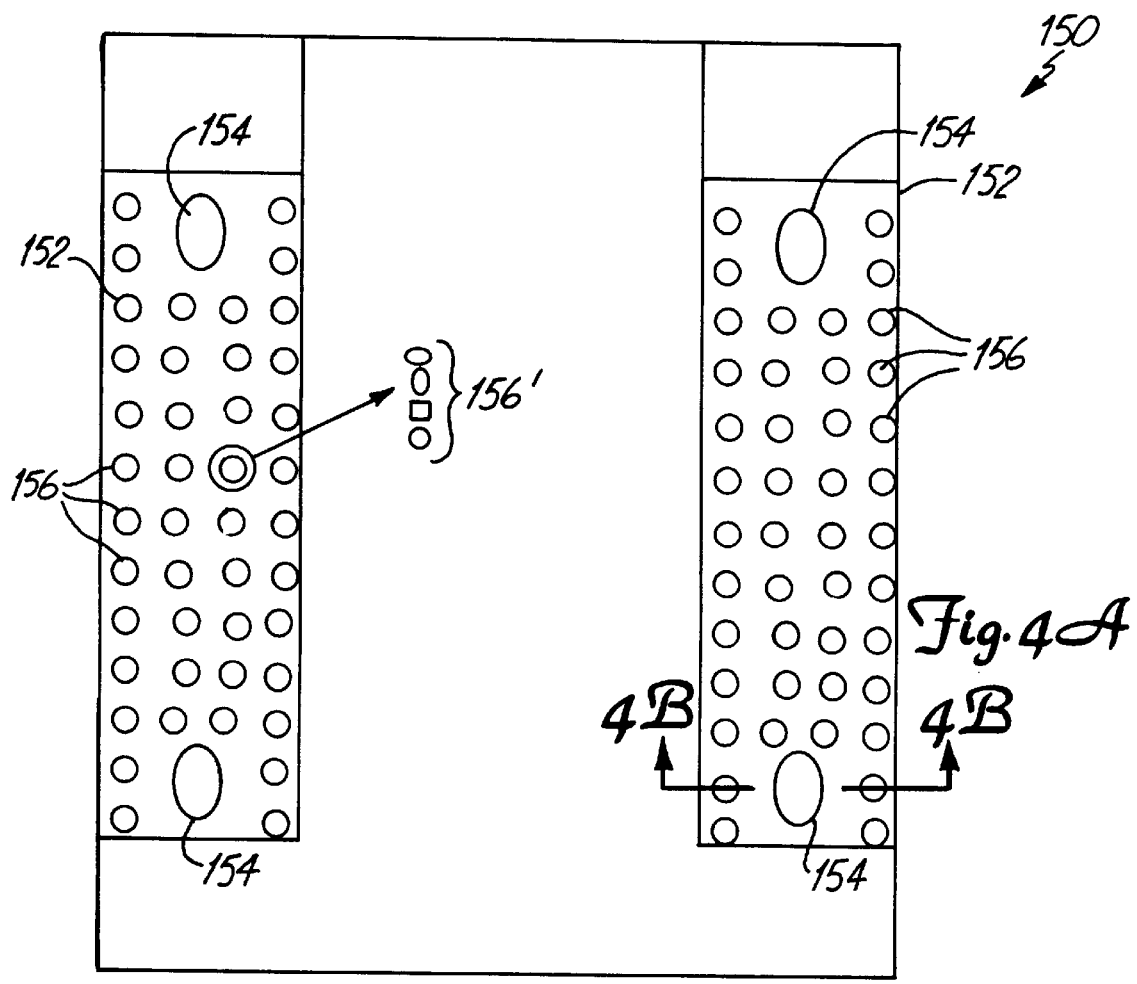

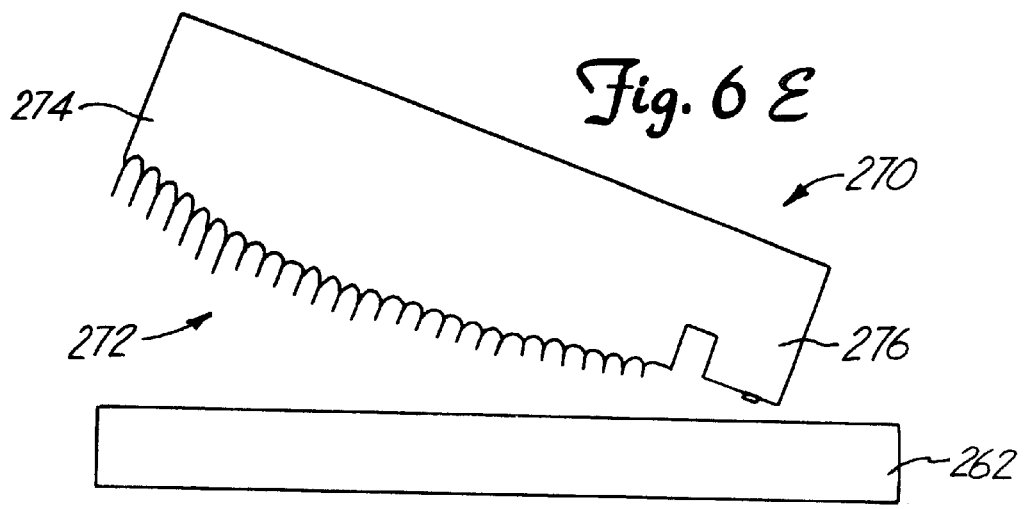

US 6,212,042 B1

SLIDER HAVING AIR BEARING SURFACE WHICH INCLUDES PADS FOR DISK STORAGE SYSTEM

The present invention claims priority to Provisional Application Serial No. 60/051,043, filed Jun. 27, 1997; Provisional Application Serial No. 60/051,044, filed Jun. 27, 1997; Provisional Application Serial No. 60/054,313, filed Jul. 31, 1997; Provisional Application Serial No. 60/055,899, filed Aug. 15, 1997; Provisional Application Serial No. 60/064,949, filed Nov. 7, 1997; Provisional Application Serial No. 60/064,785, filed Nov. 10, 1997; Provisional Application Serial No. 60/064,789, filed Nov. 10, 1997; Provisional Application Serial No. 60/064,791, filed Nov. 10, 1997; Provisional Application Serial No. 60/067,590, filed Dec. 5, 1997; and Provisional Application Serial No. 60/074,968, filed Feb. 17, 1998 and also claims priority to U.S. Pat. No. 5,870,251, issued Feb. 9, 1999, and entitled "TAPERLESS/CROWN FREE/AIR BEARING DESIGN".

BACKGROUND OF THE INVENTION

The present invention relates to disc storage systems for storing information. More specifically, the present invention relates to sliders used in such systems.

Disc drives are used for storing information, typically as magnetically encoded data, and more recently as optically encoded data, on a disc surface. A transducing head is carried on a air-bearing slider that rides on a bearing of air above the disc surface as the disc rotates at high speed. In another technique, the slider contacts the disc surface with no air bearing interface such as is shown in U.S. Pat. Nos. 5,453,315 and 5,490,027. The head is then positioned radially over the disc to read back or write at a desired location. Benefits associated with an air bearing design are lost in such "contact" sliders.

In an air bearing design, the air bearing provides an interface between the slider and the disc which prevents damage to the disc over the life of the system, provides damping if the disc drive system undergoes shock due to external vibrations. The air bearing is also used to provide a desired spacing between the transducing element and the disc surface. A bias force is applied to the slider by a flexure armature in a direction toward the disc surface. This bias force is counteracted by lifting forces from the air bearing until an equilibrium is reached. The slider will contact the disc surface if the rotating speed of the disc is insufficient to cause the slider to "fly." This contact typically occurs during start up or shut down of the disc. If the slider contacts a region of the disc which carries data, the data may be lost and the disc permanently damaged.

In many disc drive systems, a lubricant is applied to the disc surface to reduce damage to the head and the disc surface during starting and stopping. Air or gas also acts as a lubricant. However, a phenomenon known as "stiction," which is caused by static friction and viscous shear forces, causes the slider to stick to the disc surface after periods of non use. The lubricant exasterbates the stiction problem. The stiction can damage the head or the disc when the slider is freed from the disc surface. Additionally, the spindle motor used to rotate the disc must provide sufficient torque to overcome the stiction.

One technique used to overcome the problem associated with stiction is to provide texturing to at least a portion of the disc surface. However, this reduces the effective recording area of the disc. Additionally, various attempts have been made to provide texturing on the air bearing surface of the slider. For example, U.S. Pat. Nos. 5,079,657 and 5,162,073 describes a technique for forming recesses in a slider surface. Another technique which is described in U.S. Pat. No. 5,418,667 includes providing large pads which provide a pitch to the slider to allow air flow between the air bearing surface and the disc.

SUMMARY OF THE INVENTION

A disc storage system includes a rotating disc and a transducer. The transducer is carried on a slider which is supported by an armature. The armature is used to move the slider radially across the disc surface whereby information may be read from or written to the disc surface of the transducer. The slider includes an air bearing surface which faces the disc surface. As the disc rotates, the air bearing surface causes the slider to "fly" over the disc surface. Pads are provided on the air bearing surface to improve operational characteristics of the system. For example, the pads may be used to reduce the stiction or improve flying characteristics. Further, one aspect of the present invention includes techniques for fabrication of such pads.

BRIEF DESCRIPTION OF THE DRAWINGS

FIG. 4A is a bottom of a slider in accordance with another embodiment of the present invention.

FIG. 6E is a side plan view of a slider in accordance with another embodiment of the present invention.

DETAILED DESCRIPTION OF THE PREFERRED EMBODIMENTS

Figure 1:
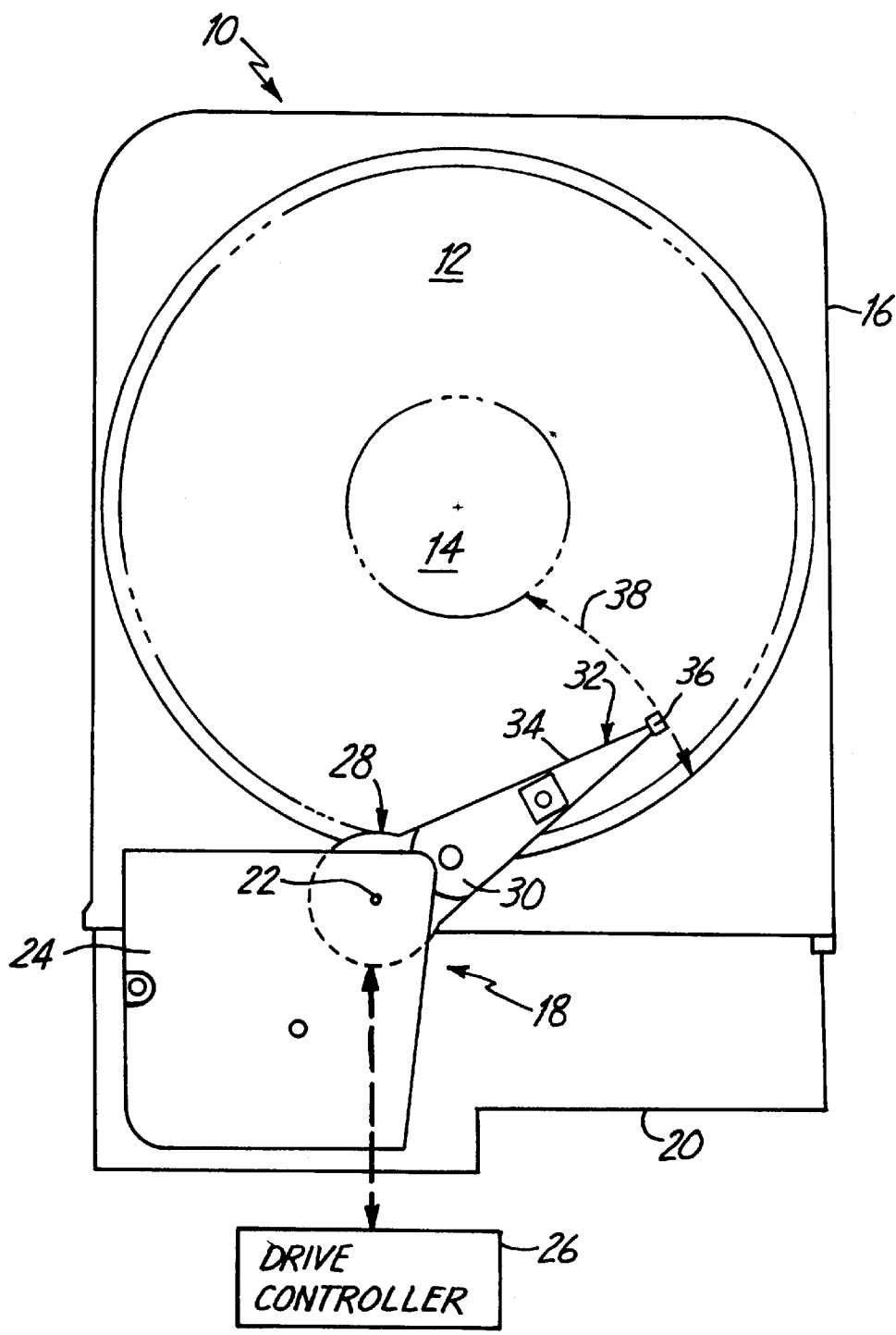
FIG. 1 is a simplified diagram of a storage disc system in accordance with the present invention.

FIG. 1 is a top view of a disc drive 10 including a slider in accordance with the present invention. Disc drive 10 includes a magnetic disc 12 mounted for rotational movement about and axis defined by spindle 14 within housing 16. Disc drive 10 also includes an actuator 18 mounted to a base plate 20 of housing 16 and pivotally moveable relative to disc 14 about axis 22. A cover 24 covers a portion of actuator 18. Drive controller 26 is coupled to actuator 18. In the preferred embodiment, drive controller 26 is either mountable within disc drive 10, or is located outside of disc drive 10 with suitable connection to actuator 18. Actuator 18, includes an actuator arm assembly 28, a rigid support member 30, and a head gimbal assembly 32. Head gimbal assembly 32 includes a load beam or flexure arm 34 coupled to rigid member 30, and a slider 36 coupled by a gimbal (not shown) to load beam 34. Slider 36 operates in accordance with the embodiments set forth herein and supports a transducer for reading information from and encoding information on disc 12.

During operation, drive controller 26 receives position information indicating a portion of disc 12 to be accessed. Drive controller 26 receives the position information from an operator, from a host computer, or from another suitable controller. Based on the position information, drive controller 26 provides a position signal to actuator 18. The position signal causes actuator 18 to pivot about axis 22. This, in turn, causes actuator 18 to pivot about axis 22. This, in turn, causes slider 36 (and consequently the transducer mounted on slider 36) to move radially over the surface of disc 12 in a generally arcuaic path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Recording density can be increased by reducing the fly height of slider 36. Close proximity of slider 36 with disc 12 allows greater accuracy in reading and writing information onto disc 12.

Stiction and fly/stiction are two major phenomena that impair the use of ultra-low flying recording heads to increase recording areal density. The solution to these problems has been to generate, in a controlled fashion, some asperities, or texture, on the media surface to reduce the area of contact at the head-media interface. The presence of these asperities on the media surface, although they can be confined to only within a small dedicated zone (i.e., a "landing zone"), enhances the chance of head-media contact during operation and thereby sets the limit to the true attainment of ultra-low flying. In most cases, due to the shape of the asperity, the nature of contact is called Hertzian contact, in which elastic deformation can occur locally. Consequently, the number of asperities on the media surface to support the head cannot be arbitrarily reduced, otherwise the interface will collapse leading to excessive stiction. In addition, this type of contact is prone to collapsing when an excessive amount of liquid lubricants are present in the interface. For example, the lubricant applied on the media to prevent wear during head-disc contact, as well as other outgassing materials from various drive components, may accumulate on the heads, and transfer to the interface thereby leading to excessive fly/stiction.

One aspect of the invention includes modeling the stiction to provide a desired texturing to the air bearing surface, as opposed to the medium surface. If the tip of the asperity in contact can be described as semi-spherical, a stiction model has predicted that head-disc interface could become unstable when the asperity density becomes too small or lube thickness too high. One stiction model is described in an article in *J. Appl. Phys.* 78, 4206 (1995) by J. Gui and B. Marchon. However, if the shape of asperity is a column or a step, the elastic deformation does not occur locally. This "non-Hertzian" contact has a much higher rigidity in comparison to a spherical type of contact. Consequently, the number of contacting points at the interface may be reduced to control stiction without worrying about the possibility that the interface may collapse. Under this contact condition, fly/stiction will not occur, and stiction is mainly a function of the contacting area (or bearing area), which can be modelled rather readily. A stiction model can be used to predict stiction level as a function of texture geometries.

Texture features may be placed on either media or sliders. However, if this kind of texture is put on a media surface, the density of these texture features still has to meet a minimum requirement imposed by the fact that if the texture features are too far apart, the slider could fall in between the texture features and directly contact the smooth media surface, leading to high stiction. One aspect of the invention that can ensure the contacts between sliders and a disc are always made on texture is to put these texture features on the sliders. Kasamatsu et. al. from Fujitsu has reported low stiction from smooth disks using heads that had small pads on the sliders in the article at *IEEE Trans. Magn.* 31, 2961 (1995).

The present invention includes small column-like texture features, i.e., landing pads, on the rails of a flying head to control stiction. For example, four such pads may be used. Sliders with such landing pads can be used on substantially smooth discs. The size and height of these landing pads must be controlled such that the pads can effectively reduce stiction during take-off yet provide enough clearance to prevent interference during normal flying. The following equations can be used to calculate the size and height of the pads based on the stiction requirement of a drive design:

$$S = \mu E a \frac{H-h}{H} \quad \text{Eq. 1}$$

$$\frac{2\gamma A}{h} \frac{d-(h/\alpha)^{1/3}}{h-(h/\alpha)^{1/3}} + \frac{2\gamma a}{h} + W = aE\frac{H-h}{H} \quad \text{Eq. 2}$$

where S is stiction, $\mu$ is coefficient of friction, E is the Young's modulus, a is the total surface area of all pads, H is the pad height, h is the head-disc separation at contact, W is the head pre-load, A is the air bearing surface area, and $\alpha$ is a constant defined by $(12\pi\gamma/A_H)$ where $\gamma$ is the surface tension and $A_H$ is the Hamaker constant.

Figure 2A:
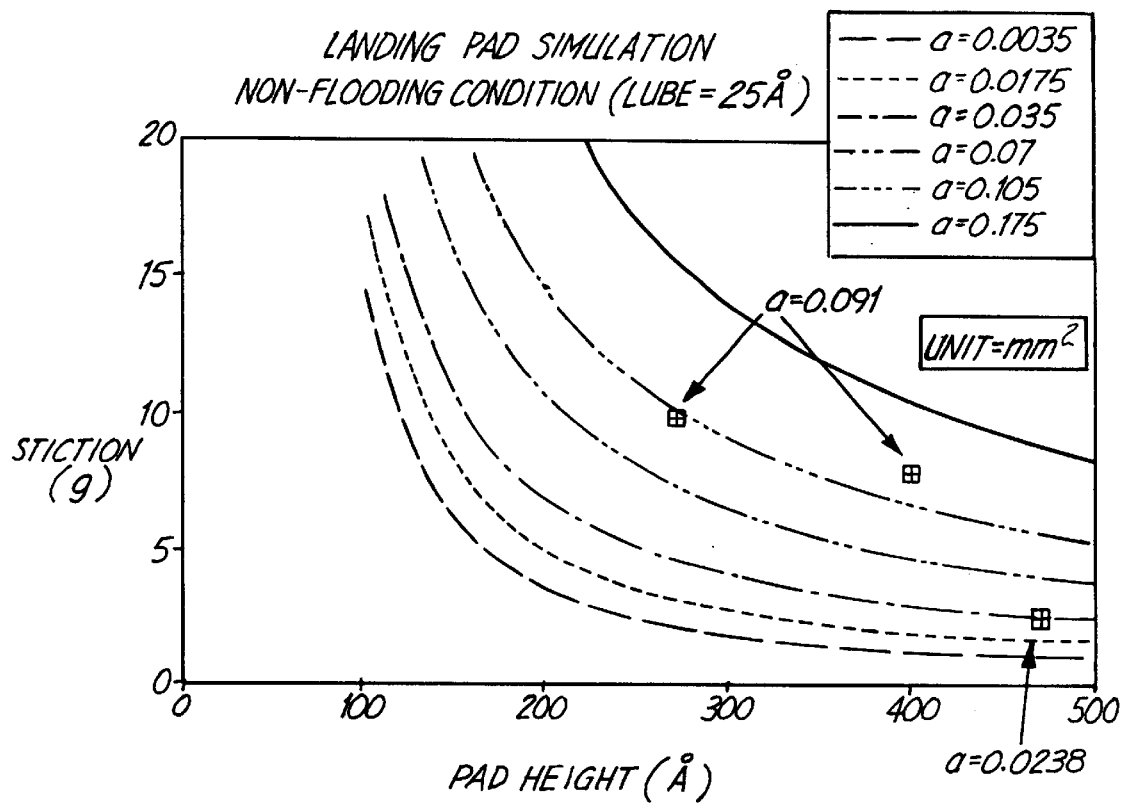
FIG. 2A is a graph of stiction as a function of height of landing pads of various sizes.

FIG. 2A is a graph of stiction as a function of the heights of the landing pads of various sizes. These curves are generated from above two equations. Based on these curves, if one chooses the total area of landing pads to be between about 0.002 to 0.003 mm$^2$, and height to be about 300 Å, stiction is between about 2 to 3 gram-force, which is well within current disc drive design requirement.

Figure 2B:
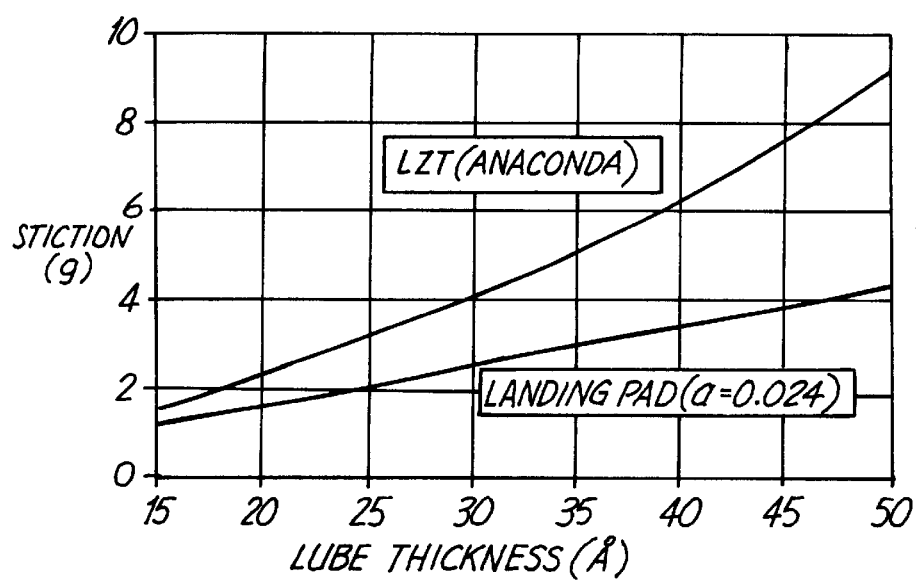
FIG. 2B is a graph of stiction as a function of lubrication thickness.

FIG. 2B shows stiction as a function of lubrication thickness for both landing pad design and a laser zone texture media design. As lube thickness increases, stiction increases. However, stiction increases much more rapidly in the case of the laser zone textured media, eventually stiction diverges at still higher lube thickness. This interface instability is the fundamental cause of fly/stiction. In the case the landing pad texture, on the other hand, stiction exhibits a well defined linear relationship with lube thickness. It does not diverge as lube thickness continues to increase. In other words, the fly/stiction problem does not occur for landing pad texture.

The modeling technique set forth herein may be used with other aspects of the present invention. The shape, density and placement of the pads may be modified as desired. Further, the pads may be formed using any appropriate technique. Such formation techniques are not limited to those specifically set forth herein.

Figure 3A:
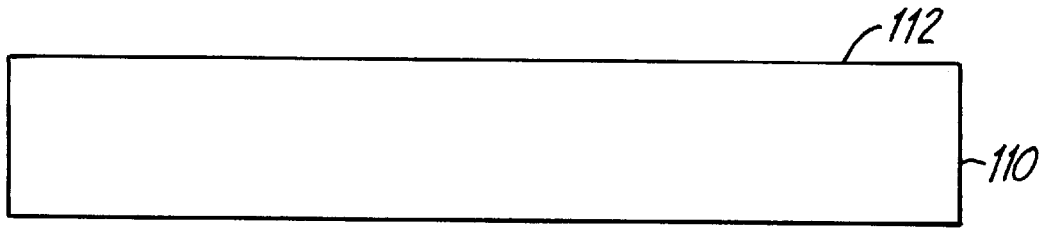
FIGS. 3A–3D are side cross-sectional views of steps in a process in accordance with one embodiment of the present invention for forming landing pads.
Figure 3B:
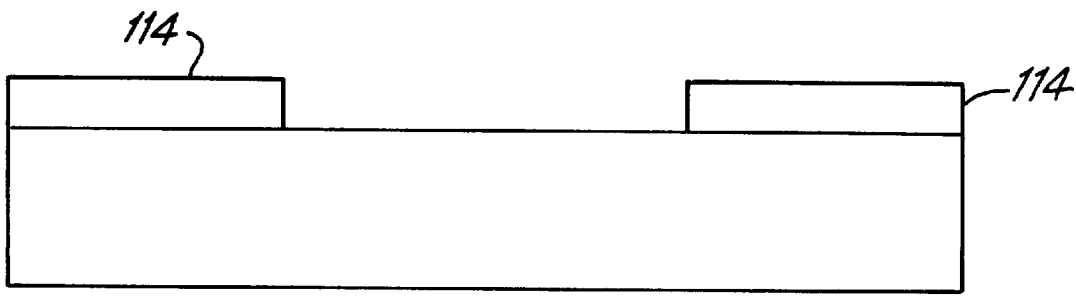
Figure 3C:
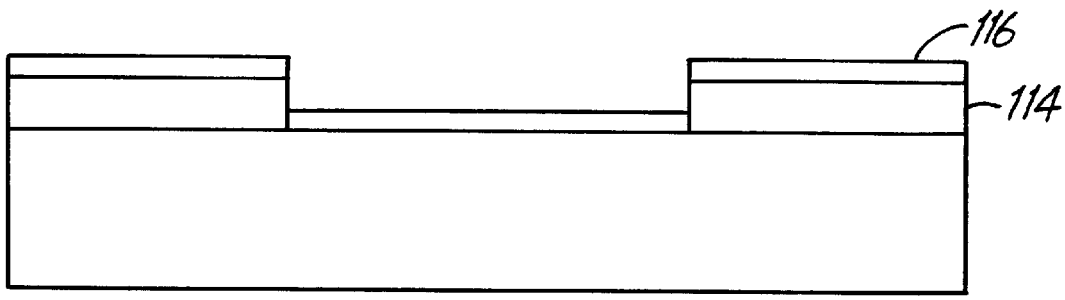
Figure 3D:
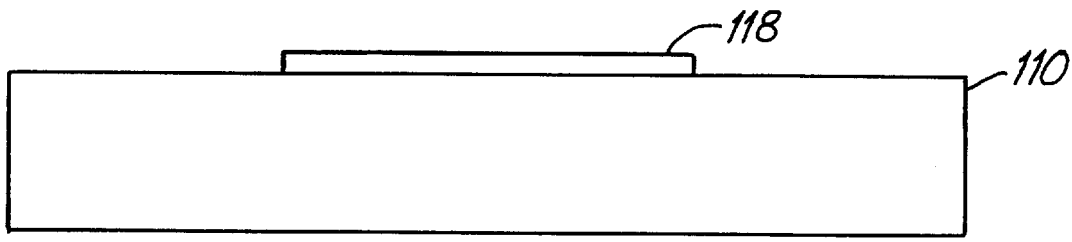

One aspect of the present invention includes various techniques for forming landing pads. FIG. 3A is a cross-sectional view of one embodiment of a slider 110 in an area on which landing pads are to be formed on surface 112. The slider body is coated with a vacuum compatible negative photoresist and the resist 114 is patterned as shown in FIG. 3B. Next, a landing pad material is deposited anisotropically, typically using an ion beam to deposit, for example, diamond-like carbon (DLC) to form DLC layer 116. The photoresist 114 and its overcoat of DLC are removed using any appropriate technique such as sodium bicarbonate blasting followed by a cleaning step such as a deionized water rinse and a dry to form pad 118 as shown in the cross section of FIG. 3D.

Figure 3E:
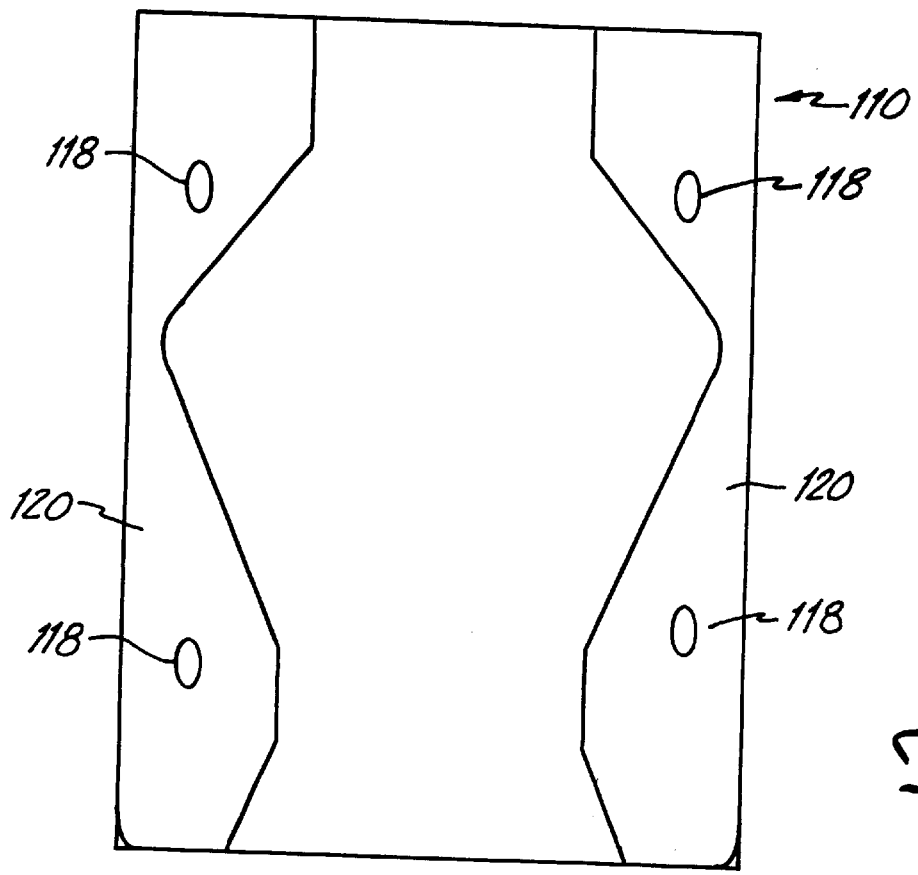
FIG. 3E is a bottom plan view of a slider including landing pads made in accordance with the steps of 3A–3D.

This process offers a number of advantages over other techniques. For example, using this embodiment the edges of pad 118 are automatically deposited such that they blend smoothly into the slider body surface. This advantages arises from the "penumbral" shadowing of the anisotropic deposition process. Further, the landing pad material can be deposited over a previously deposited protective layer of the same material. This provides some protection from corrosion and electrostatic discharge (ESD) hazard to sensitive material used in the magnetic transducer early in the fabrication process. No additional adhesion layer, such as silicon, is required. The mechanical removal process makes any deviations which result from a landing pad material adhesion failure immediately and obviously detectable thereby providing improved reliability. This technique is also less expensive than reactive ion etching techniques and the pad can be deposited relatively quickly. The increased speed provides improved manufacturability and reduced costs by minimizing work in process. The process is also compatible with current techniques used for processing arrays of slider bars as they are lapped to their final surface finish. This is less expensive than attempting to deposit pads on individual sliders. Further, the process is compatible with materials that are difficult or impossible to remove from the substrate using etching or milling processes. Such materials include hard materials such as cathodic arc diamond films. FIG. 3E is a bottom plan view of slider 110 showing four pads 118 carried on rails 120. Using a four to eight pad design such as shown in FIG. 3E, in one preferred embodiment of the invention the pads have a area of between about 100 $\mu$m$^2$ to about 12,000 $\mu$m$^2$. The pads may provide any shape such as square or elliptical with an aspect ratio of about 2 to 1. Any other shape may be used such as round, tear drop, etc.

Figure 3F:
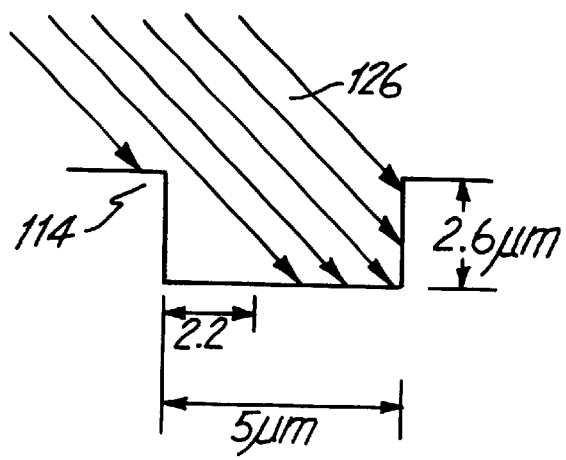
FIG. 3F is a side view of a mask in accordance with one embodiment of the invention.
Figure 3G:
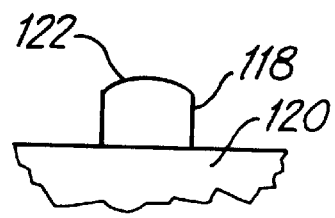
FIG. 3G is a side plan view of a landing pad formed using the mask of FIG. 3F.
Figure 3H:
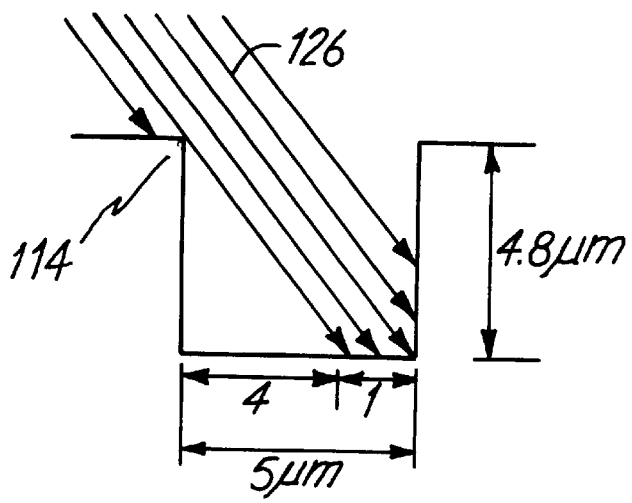
FIG. 3H is a side view of a mask in accordance with one embodiment of the invention.
Figure 3I:
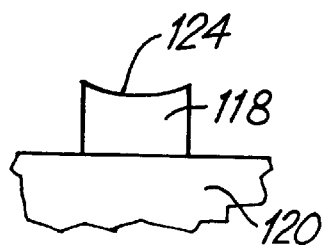
FIG. 3I is a side plan view of a landing pad formed using the mask of FIG. 3H.

One aspect of the present invention includes controlling the angle of deposition relative to the plane of the substrate to form a desired surface on the landing pad. FIG. 3F shows one embodiment in which mask 114 has a thickness of 2.6 $\mu$m and a width of 5 $\mu$m. The ion beam 126 used for deposition is angled such that there is a 2.2 $\mu$m shadow. The substrate is rotated during deposition such that a convex contacting surface 122 as shown in FIG. 3G is formed on pad 118. FIG. 3I shows a concave contacting surface 124 on pad 118. Such a concave surface may be formed using the mask 114 shown in FIG. 3H having a thickness of 4.8 $\mu$m and a width of 5 $\mu$m. This provides the 4 $\mu$m shadow which, as the substrate rotates, causes the contact area of the pad 118 to have the concave shape. Such concave or convex shapes are particularly advantageous because the reduce the size of the contact area. Further, such shapes may have desirable hydrodynamic properties.

The above processing steps may be used to form any of the pads set forth herein, or other pads which are not explicitly set forth herein, as desired. The particular shape, height, placement and density of the pads may be in accordance with any particular design to achieve desired slider characteristics.

The present invention includes a novel technique for creating pads on the air bearing surface. As used herein, the term "pad" includes the structure formed by forming grooves in the air bearing surface of the slider. In one aspect of the invention, such pads or grooves are created using a laser beam, such as a pulsed continuous laser, at preferred locations along the air bearing surface. The dimensions of the features may be adjusted by varying the laser power, the pulse duration, the laser wavelength, etc. Instead of using diamond-like carbon, in this aspect of the invention the contact surface is the same as the slider, for example, AlTiC. This reduces the concern of wear of the DLC due to repeated landings and take offs. Further, the real area of contact between the disc and the head is reduced in comparison to "feet" type bumps in that the contact area is a line contact rather than an area contact. Further still, application of such a laser is easily integrated into current manufacturing techniques which use a laser to form the crown on a slider.

Diamond-like carbon is not considered advantageous for the formation of the pads in all embodiments of the invention. For example, DLC tends to wear with time and requires additional processing steps.

In another aspect of the invention, pads or feet are formed of AlTiC. For example, such feet may be formed through the application of a photoresist at selected locations on the slider followed by a subsequent etch such as an extended etch milling process. The photoresist is then removed revealing raised areas in the AlTiC slider body. For example, in FIG. 3B, ion milling may be applied to slider 110 thereby removing exposed portions of slider 110.

These techniques may be used to form pads of any shape, position, density, or other desired characteristics whether or not specifically set forth in the present disclosure.

Figure 4B:
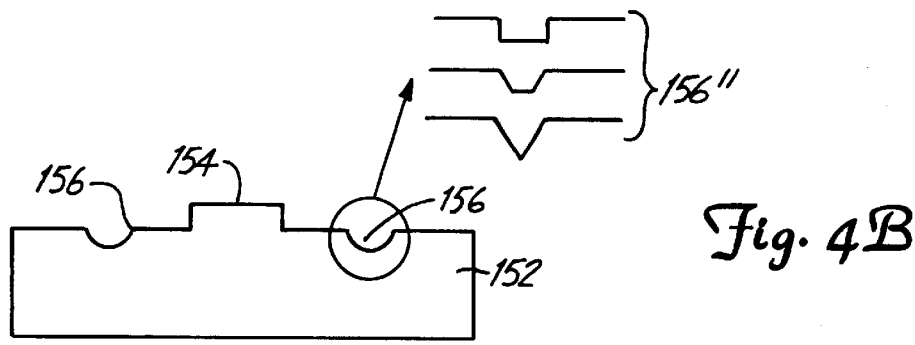
FIG. 4B is a side cross-sectional view of a rail of the slider of FIG. 4A.

FIG. 4A is a bottom plan view of a slider 150 in accordance with another embodiment of the present invention. Slider 150 includes rails 152 carrying pads 154. Furthermore, in accordance with one aspect of the present invention, depressions or recesses 156 are formed on rails 152. FIG. 4B is a cross-sectional view of rail 152 taken along the line labeled 4B—4B shown in FIG. 4A and shows a cross-sectional view of recesses 156.

Figure 4C:
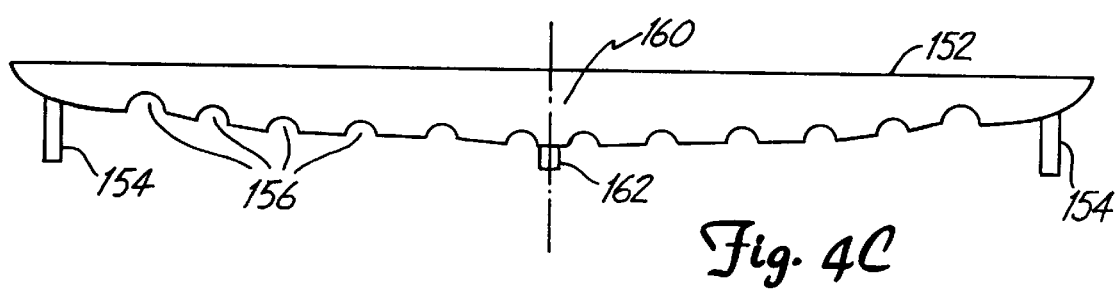
FIG. 4C is a side plan view of a rail of a slider in accordance with another embodiment of the present invention.

The invention as set forth in FIGS. 4A and 4B is particularly advantageous because depressions 156 produce a hydrodynamic effect providing additional lift. Furthermore, as illustrated in FIG. 4C which is a side plan view of rail 152, rail 152 typically includes a curvature between the leading and trailing edges. This curvature is referred to as a crown and may be on the order of 20 nm. Curvature along the outer rail and inner rail is referred to as camber and is on the order of 8 nm. If pads 154 have a height of 20 to 30 nm, the crown of rail 152 may be sufficient to interfere and cause contact to occur to the center region 160 of slider 152 and the disc surface. Recesses 156 provide additional lift to prevent such contact.

This aspect of the present invention is particularly advantageous because it does not require additional protrusions yet provides increased hydrodynamic effects during flying. This allows the slider to achieve a lower flying height by decreasing the air bearing effect. This "microhydrodynamic" effect improves flying characteristics when the slider transitions from a stationary position to a sliding position and vice versa. Recesses 156 may be optimized both in size, depth and shape. Recesses 156' in FIG. 4A show four example shapes which may be used for recesses 156. Similarly, recesses 156 and 156" shown in FIG. 4B are various examples of cross-sectional shapes. The specifications for recesses 156 may be optimized by modeling using, for example, Reynold's Equation and/or by performing experiments. In some embodiments, it may be possible to eliminate the crown on the rails 152. However, in another aspect of the invention, additional pads 162 may be added near the center line on the rail 152 as shown in FIG. 4C. Pad 162 may hit a height which is less than the height of pads 154. In one embodiment, the height of pads 154 should be slightly larger than the tallest asperity present in the media, typically around 10 nm for a very smooth media in which the roughness Ra is about 1 nm.

Furthermore, recesses 156 can be designed to provide additional damping to the air bearing for load/unload applications in which the quick formation of an air bearing between the slider and the disc is critical. Such air bearing damping is very advantageous for establishing the air bearing. The recesses 156 may also be used to provide additional damping should slider 150 contact an asperity on the disc surface. One aspect of the invention includes an air bearing surface including such recesses but without the use of landing pads. This is particularly advantageous for load/unload as there are no zero speed/stiction issues. Thus the recesses provide additional damping and reduced flying characteristics.

Another aspect of the present invention may be employed with pads in accordance with other aspects of the invention, or other pads which are not specifically set forth herein. Further, the recesses may be of any desired shape, form, depth, density to achieve desired air bearing characteristics.

Figure 5A:
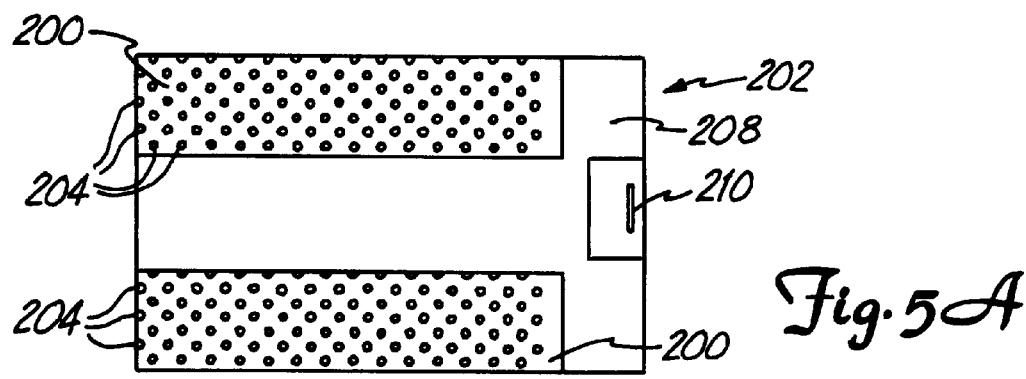
FIG. 5A is a bottom plan view of a slider in accordance with another embodiment of the present invention.

In another aspect of the present invention, rails 200 of slider 202 as shown in FIG. 5A includes a large plurality of pads 204 formed thereon. This configuration of the invention is particularly advantageous. With the present invention, numerous small pads are fashioned over a majority of the air bearing surface of the slider. As discussed above, the head to disc spacing during the read and write operations is critical to recording densities. Therefore, the textured pads 204 stop at a position which is spaced apart from the trailing edge 208 of the slider 202 and the transducer 210.

By placing numerous pads 204 across a relative large area, the interface between the slider 202 and the disc surface is less sensitive to changes in the crown or flatness of the slider. Further, the use of numerous pads 204 is advantageous because it provides improved reliability as a single defective pad will not cause a catastrophic failure. Further still, this aspect of the present invention provides a head/disc interface which may be studied based upon studies performed on head/disc interfaces in which the disc surface is textured and the slider is smooth.

During take-off, slider 202 tends to rock back and forth, and/or side to side. The use of multiple pads 204 allows the load to be distributed over numerous pads, even during this rocking motion. The pads 204 are also relatively easy to align with the air bearing surfaces during manufacture. Further, the use of numerous pads to provide a fully textured air bearing surface provides reduced friction and stiction relative to a design with four pads.

Experiments conducted in accordance with the present invention showed that the fully textured configuration provided an average dwell stiction of about 5 grams whereas a design using four pads yielded a dwell stiction of about 15 grams. In one preferred embodiment for the fully textured air bearing surface, the pads have a height of between about 100 and about 1000 Å, an area of between about 10 and 100 $\mu m^2$, a density of about 1 pad per about 100 $\mu m^2$ to about 10,000 $\mu m^2$. The pads may be distributed across anywhere from about 10% to about 100% of the air bearing surface, in one preferred embodiment, the full texturing is confined to an area in about the middle ⅔ of the rails. Further still, in some designs it may be desirable to have pads positioned differently on an inner rail of the slider versus an outer rail. For example, the relationship between pads on the rails may be such that pads on one rail are closer to a leading edge while pads on the other rail are closer to a trailing edge. However, these parameters may be adjusted as appropriate based upon the particular configuration and desired specifications.

Figure 5B:
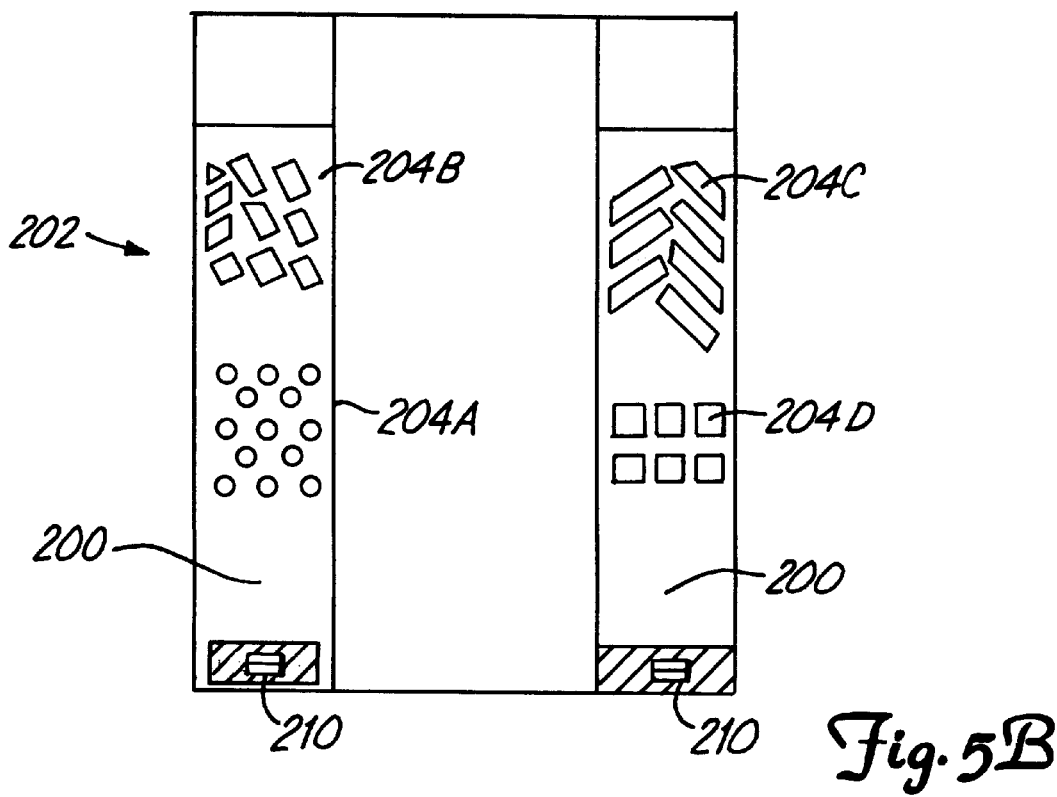
FIG. 5B is a bottom plan view of a slider in accordance with another embodiment of the present invention.

FIG. 5B is a bottom plan view of slider 202 showing rails 200 with various configurations for pads 204. As shown in FIG. 5B, pads 204 may by circular (204A), rectangular (204B), angled rectangles (204C), squares (204D), etc. the shape and placement of pads 204 may be predefined using masking techniques or may be random.

Figure 6A:
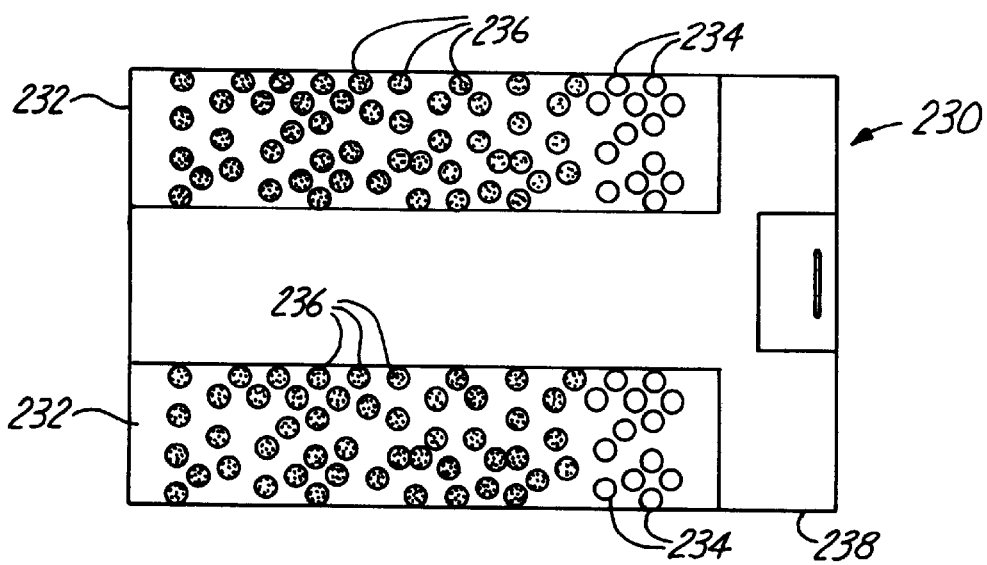
FIG. 6A is a bottom plan view of a slider in accordance with another embodiment of the present invention.

FIG. 6A is a bottom plan view of a slider 230 having rails 232 in accordance with another embodiment. Rails 232 carry pads having heights which vary with position. In this example of the invention, pads 234 have a height which is different than pads 236. Varying the height of the pads can be used to further reduce fly stiction and dwell stiction. In the present example, pads 236 have a greatest height which is greater than about 200 Å and pads 234 have a lowest height which is about 200 Å. The greater height of pads 200 improves the margin for stiction and wear of the pads. Further, the lower height pads 234 help avoid contact between the trailing edge 238 of slider 230 and the disc during operation. Furthermore, as illustrated in FIG. 6A the location of the pads can be randomized. Such randomization reduces the chance that the pads will contact the disc along the same track during repeated operation. This reduces unbalanced wear on the disc surface.

Figure 6B:
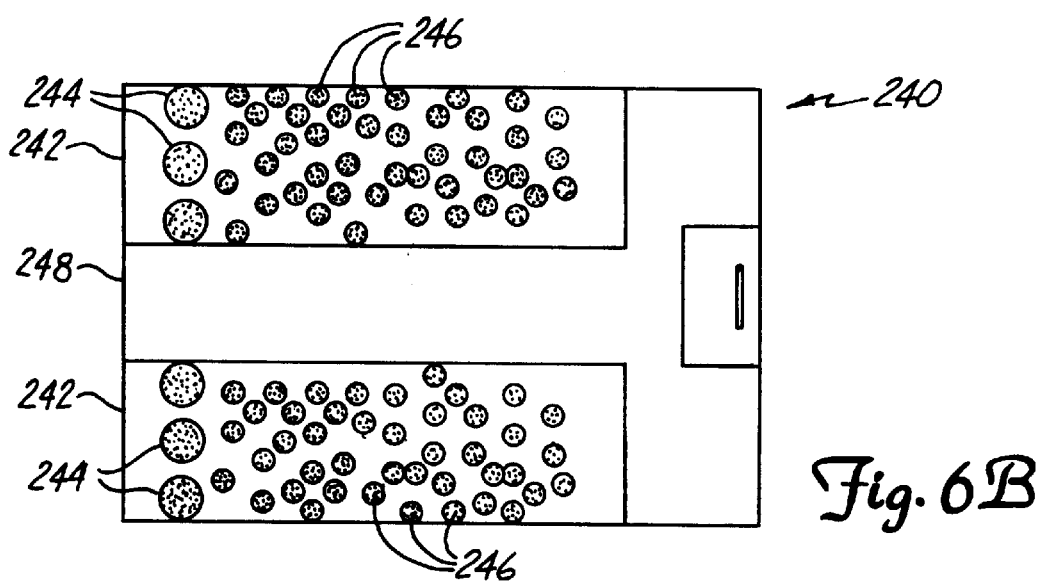
FIG. 6B is a bottom plan view of a slider in accordance with another embodiment of the present invention.

In another aspect of the invention, the area of the pads can be varied either randomly or as a function of position. FIG. 6B is a bottom plan view of slider 240 having rails 242 carrying pads 244 and 246. As illustrated in FIG. 6B pads 244 which are near the leading edge 248 of slider 240 provide a larger area in comparison to pads 246. This configuration is advantageous because pads near the leading edge 248 of slider 240 tend to experience increased wear and stress relative to pads closer to the trailing edge. The large front pads 244 exhibit improved wear behavior and are less likely to be broken during operation.

Figure 6C:
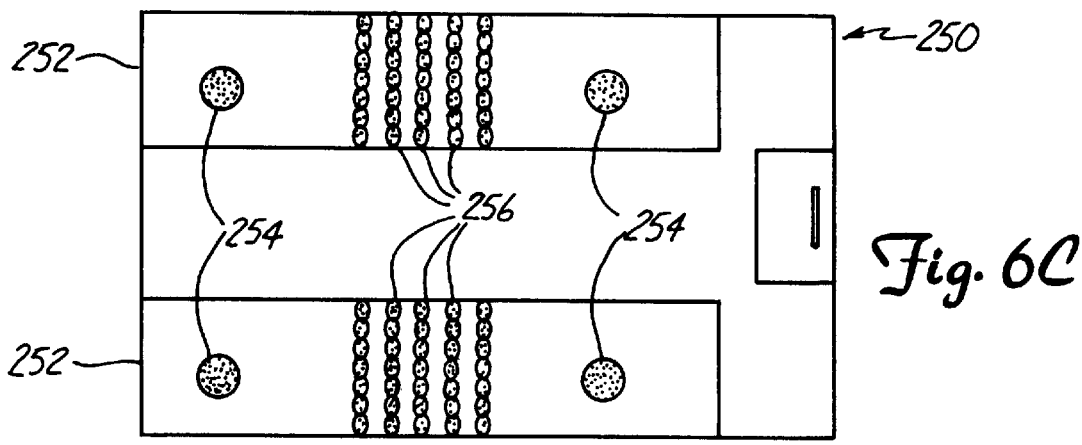
FIG. 6C is a bottom plan view of a slider in accordance with another embodiment of the present invention.

FIG. 6C is a bottom plan view of a slider 250 in accordance with another embodiment having rails 252. Rails 252 include pads 254 and 256. Preferably, there are a plurality of pads 256 positioned near the crowned portion of a crowned rail 252. Pads 256 may be of number, density, height and shape, etc. as desired to reduce contact between the crowned portion of rails 252 in the medium.

Figure 6D:
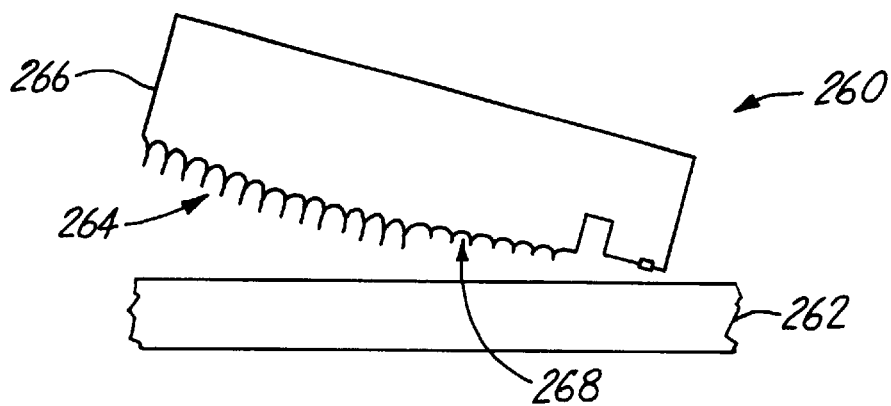
FIG. 6D is a side plan view of a slider in accordance with another embodiment of the present invention.

FIG. 6D is a side view of a slider 260 in accordance with another embodiment shown relative to storage disc 262. In the embodiment of FIG. 6D, pads 264 positioned near the leading edge 266 of slider 260 have a height which is greater than pads 268 positioned closer to the trailing edge. Pads 264 extend from the leading edge to the mid section of slider 260. This is particularly advantageous for heads in which the leading edge may experience increased wear in comparison to the trailing edge due to a negative pitch of the slider during initial operation.

Pads 268 may be formed using a second mask, or other technique set forth herein, for example, and disposed with a height to avoid contact with medium 262 during normal operation. Further, pads 264 reduce stiction during normal operation and are capable of absorbing any contact or wear should the slider 260 pitch forward.

FIG. 6E is a side view of a slider 270 shown flying over disc 262 in accordance with another embodiment. Slider 270 includes bumps 272 in accordance with the present invention. In the embodiment of FIG. 6F, bumps 272 have are tallest near the leading edge 274 of the slider which is progressively shorter in a direction toward the trailing edge 276. This may be a relatively continuous change or may be through a series of steps. The geometry may be obtained through an desirable technique. For example, through the use of shadowing during the deposition and formation processes.

Another aspect of the present invention includes the recognition that placement of pads on the air bearing surface may be used to optimize performance.

For example, placing pads closer to the trailing edge of the slider can improve contact start/stop (CSS) performance because the slider is less likely to tip backwards thereby contacting the trailing edge of the air bearing surface which would lead to stiction with the polished media. However, slider flyability is improved by moving the rear pads toward the leading edge of the slider. Placing the rear pads near the leading edge of the slider reduces the likelihood that the pads will contact the media surface due to changes in altitude, roll sensitivity and access fly height losses.

Figure 7A:
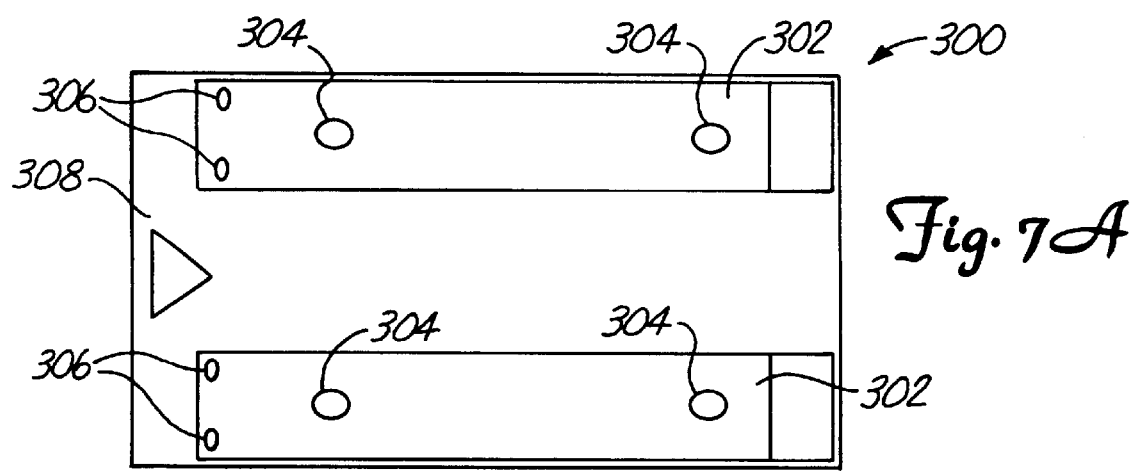
FIG. 7A is a bottom plan view of a slider in accordance with another embodiment of the invention including kick pads.
Figure 7B:
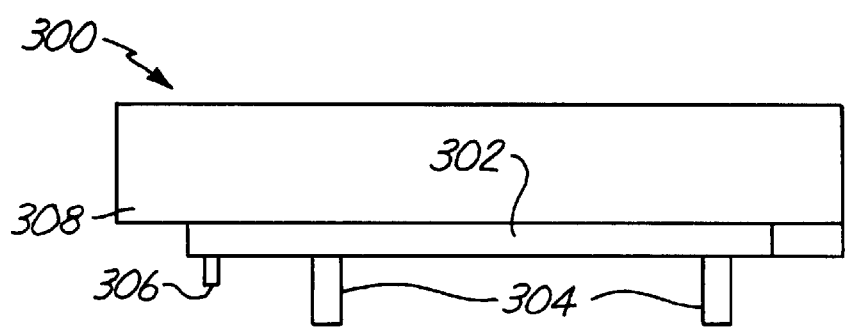
FIG. 7B is a side plan view of the slider of FIG. 7A.

The present invention also provides a technique to overcome the tradeoff between CSS and flyability performance. FIG. 7A is a bottom plan view and FIG. 7B is a side plan view of slider 300 in accordance with another embodiment of the invention. Slider 300 includes rails 302 and pads 304. Further, slider 300 includes kick pads 306 positioned behind pads 304, closer to trailing edge 308 of slider 300. Kick pads 306 prevent slider 300 from tipping during operation in a manner which would cause the trailing edge of slider 300 to contact the medium surface. This will avoid a high stiction orientation during operation. Further, kick pads 306 allow pads 304 to be placed closer to the leading edge of slider 300 thereby improving flyability of slider 300. Preferably, kick pads 306 have a height which is less than the height of pads 304 such that pads 306 do not contact the media surface during normal flying. The design of pads 304 and 306 is preferably such that they may be easily integrated into the manufacturing process and have size, shape and positioning to achieve the desired flying and start/stop characteristics for a particular slider, media, lubrication, speed, etc. The kick pads 306 may be of appropriate size, shape or density as desired.

One aspect of the use of pads on sliders in accordance with the present invention is that the pads may become smooth as the surface is worn over time. This tends to reduce the compatibility of the pads with a very smooth media surface. The smooth pad may increase the dynamic friction.

One aspect of the invention includes texturing the pads to thereby provide a rough surface on the pad to further reduce contact area and thereby reduce friction. The texturing may be in accordance with any technique. However, one technique which may be integrated in a diamond-like carbon pad is through the introduction of small particles, such as silicon dioxide, slightly below the diamond-like carbon. For example, the smallest particles may be 3 to about 20 nm below the DLC. The total thickness is in one embodiment, between about 30 nm and about 50 nm. The texture may be applied directly to the air bearing surface, (for example, using a mask to form a pad) on a DLC pad, on adhesion layer, or in multiple layers of particles and DLC. Such particles may provide a height of between about 0.1 micro inches to about 10 micro inches.

Figure 8A:
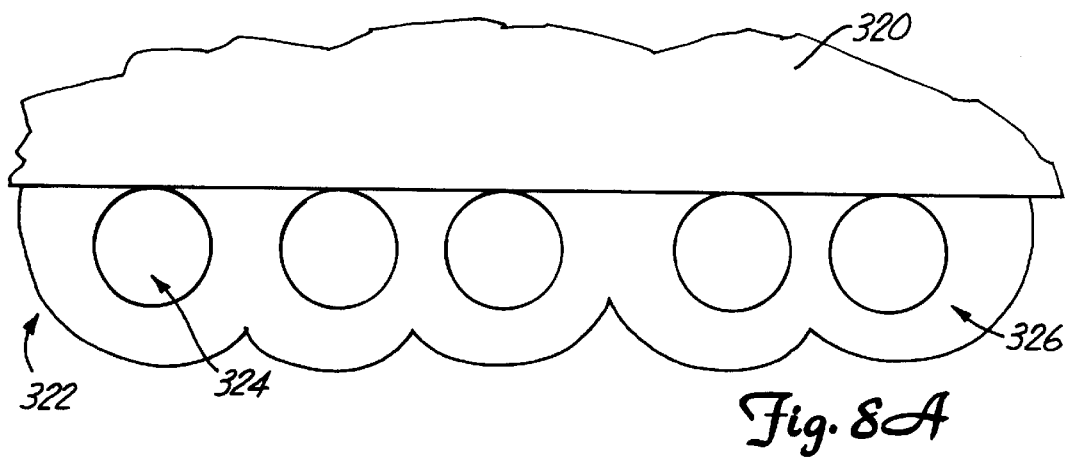
FIGS. 8A, 8B and 8C are side cross-sectional views of pads in accordance with embodiments of the invention.

FIG. 8A is a side cross-sectional view of a rail 320 of an air bearing surface carrying a pad 322. Pads 322 include particles 324, such as silicon dioxide, coated with a DLC layer 326. As illustrated in FIG. 8A, the particles 324 provide a texturing to the surface of the DLC layer 326.

Figure 8B:
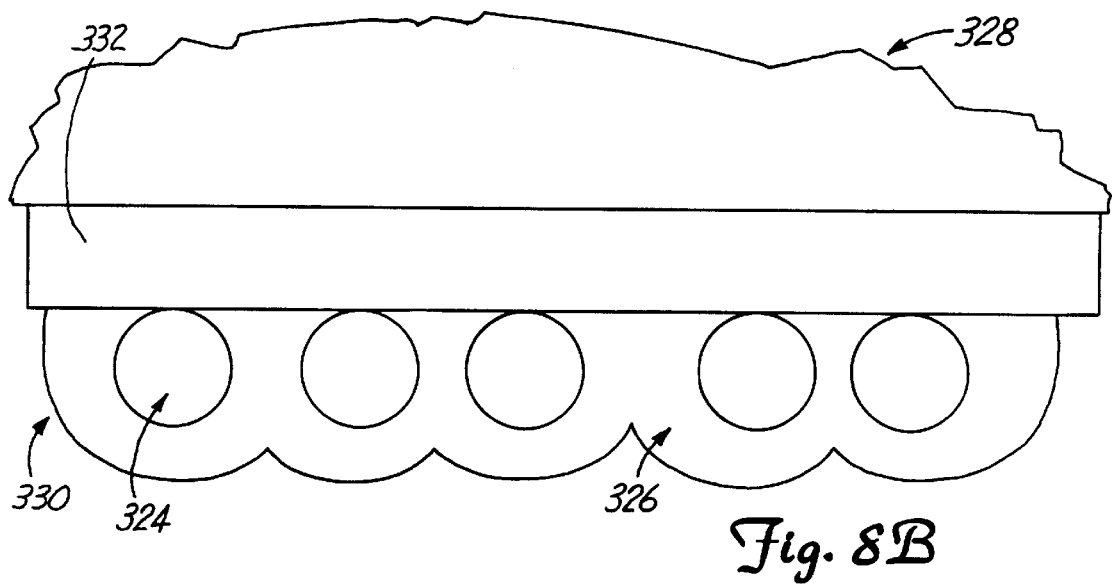

FIG. 8B is a cross-sectional view of an air bearing surface 328 of a rail 328 in accordance with another embodiment in which a pad 330 is formed on an intermediary layer 332 which carries particles 324 and DLC layer 326 thereon. Intermediary layer 332 may, for example, comprise a DLC layer or an adhesion layer with particles 324 deposited thereon.

Figure 8C:
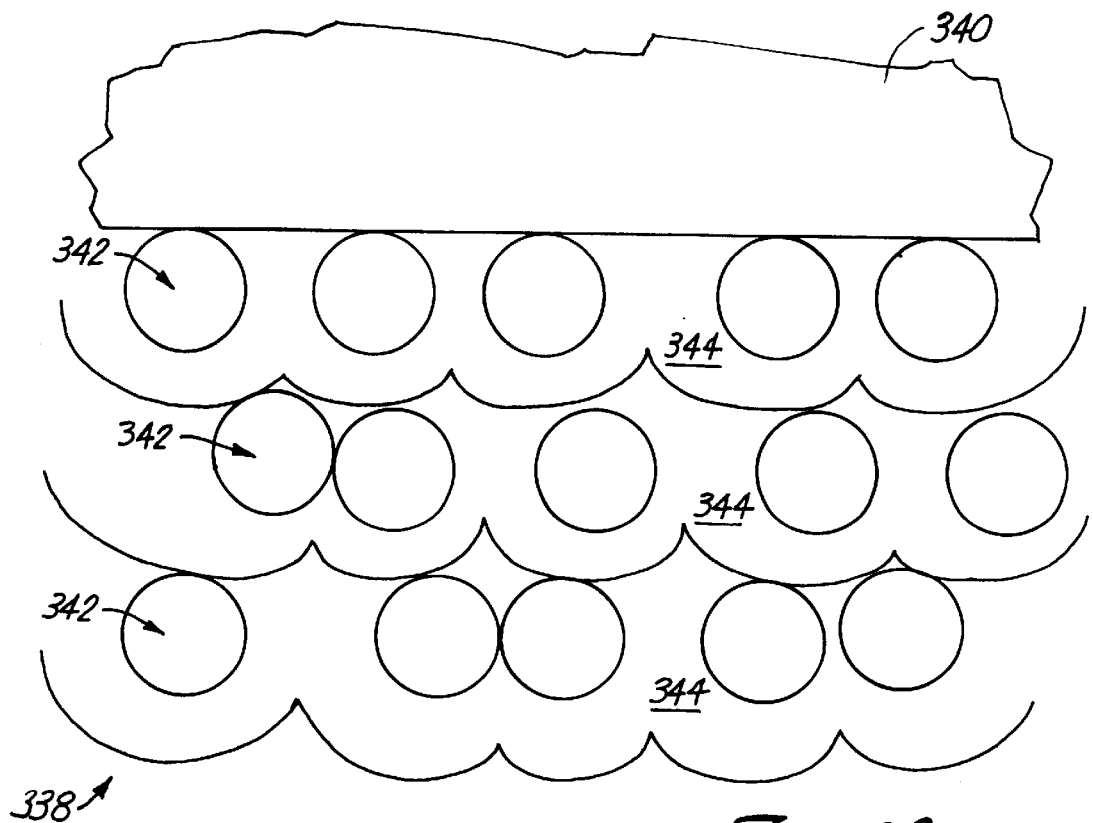

FIG. 8C is a cross-sectional view of a pad 338 in accordance with another embodiment deposited on the air bearing surface 340 of a rail. Pad 338 is formed using any desired number of multiple layers of particles 342 and DLC layers 344. This provides multiple layers of texturing which may be exposed as head 338 wears over extended use.

Figure 8D:
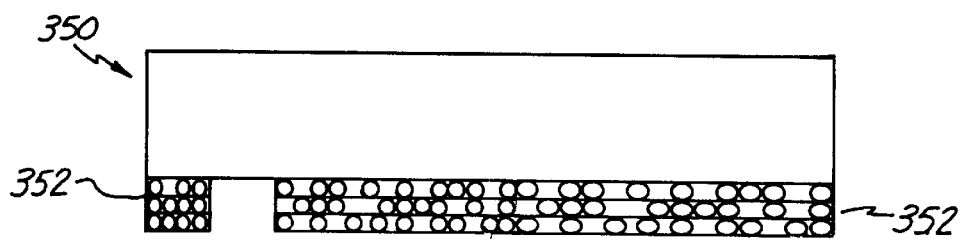
FIG. 8D is a side plan view of a slider having an air bearing surface formed in accordance with the embodiments of FIGS. 8A–8C.

The particles may be deposited on the air bearing surface or landing pads to provide desired texturing. The DLC, or other layer, is applied to encapsulate the texture into the substrate. This layer also preferably provides a good tribological material. Tall structures may be obtained using multiple layers. FIG. 8D is a side plan view of a slider 350 including air bearing surfaces 352 which are formed using a texturing technique in accordance with this aspect of the invention in which a plurality of small particles are injected into layers of material during fabrication.

Figure 9A:
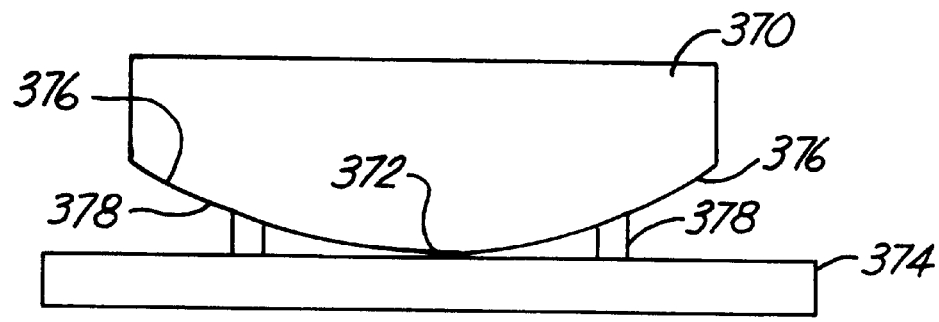
FIG. 9A is a side plan view of a slider in accordance with one embodiment of the invention shown relative to a medium surface.
Figure 9B:
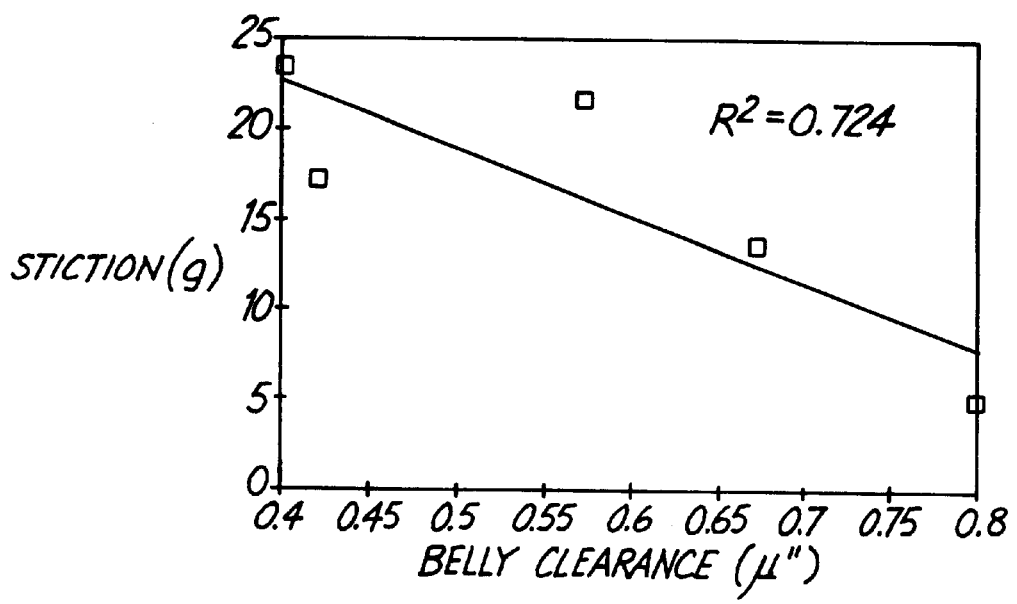
FIG. 9B is a graph of stiction versus belly clearance for a slider.

As set forth herein, pads on sliders in accordance with the present invention allow the slider to fly closer to the medium and thereby provide higher areal recording density. Further, the need for zone texture on the medium is eliminated. FIG. 9A is a side plan view of a rail 370 of a slider in accordance with one embodiment of the present invention. Rail 370 includes a crown in which the middle portion 372 of the rail is closer to the medium 374 in comparison to end portions 376. This four pad design (two pads on each rail) may, in some embodiments, be susceptible to high stiction because of the interface between crown portion 372 and medium 374. As illustrated in FIG. 9A, the minimum separation distance between the air bearing surface of rail 370 and the surface of medium 374 is defined by the clearance at crown portion 372 rather than by the height of pads 378. As the crown may be substantial, especially in 50% slider designs in which the clearance between crown portion 372 can be significantly smaller than the height of pads 378. Thus, a large menisci is formed between crown portion 372 and medium 374 which leads to relatively large stiction. For example, FIG. 9B is an example of stiction versus belly clearance (i.e., crown clearance) for a 50% slider design having four pads 378. The data from FIG. 9B is the three second dwell stiction for sliders having four pads with a 15 Å lubricant film having a medium molecular weight. The variations in the belly heights for the five different heads plotted are caused by variations in the crown while the pad height was roughly constant at about 1.3 to 1.4 μinches. As illustrated in FIG. 9B, there is a strong correlation between stiction and belly clearance. In particular, a low belly clearance (i.e., highly crowned) slider exhibits very high stiction whereas heads with greater clearance provide significantly less stiction. Since the height of pads 378, and in particular the height of the rear pad, is constrained by the requirement that when the head is flying over medium 374 the trailing edge of the slider which carries the transducer must be positioned very close to the disc surface, this stiction represents a critical issue in four pad designs having crowned rails.

Figure 9C:
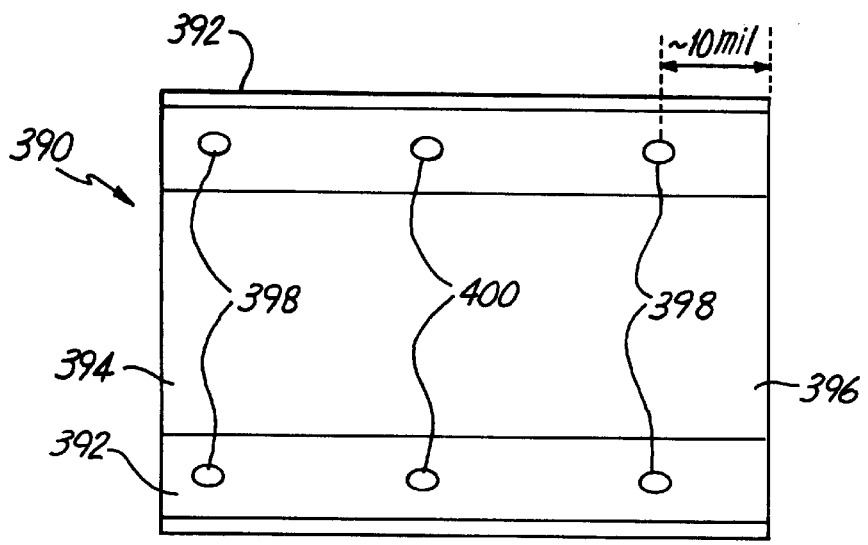
FIG. 9C is a bottom plan view of a slider in accordance with another embodiment of the invention.

FIG. 9C is a bottom plan view of a slider 390 in accordance with another embodiment. Slider 390 includes rails 392 extending from a leading edge 394 to a trailing edge 396. Slider 390 further includes outer edge pads 398 and middle pads 400. The addition of middle pads 400 cause the effective crown between adjacent pads to be reduced by a factor of 4 in comparison to the four pad designs shown in FIG. 9A. Consequently, the clearance problems shown in FIG. 9B are mitigated.

In another aspect of the present invention, the problem associated with crown can be eliminated by leaving the slider uncrowned and using only four pads. The four pads lift the slider air bearing surface off of the medium when the head is at rest such that a crown is not necessary for take-off. With such a zero crown design, the separation between the air bearing surface and the medium surface is determined by the pad height and the stiction problem illustrated in FIGS. 9A and 9B is eliminated. In another embodiment, a slight crown is provided such that the clearance is sufficiently great to provide the desired stiction reduction. For example, using the data given in FIG. 9B, if the crown is less than 0.2 μinches, the disc to air bearing surface separation will be determined primarily by the pad height.

In another aspect of the present invention, it has been recognized that various portions of a slider are subjected to contact with the disc surface during take off. During the initial phase of take off, the middle portion (i.e., "belly") of the slider contacts the medium. As the velocity increases, the leading edge of the slider contacts the medium because the slider tips forward. Finally, after take off, formation of the air bearing causes the slider to tip in the opposite direction leading to contact with the trailing edge. Thus, different portions of the slider are in contact with the medium surface during different take off periods. In one experiment, contact start/stop testing was performed on an air bearing surface in accordance with embodiments set forth herein having DLC pads on a highly polished medium surface. It was discovered that the pads located at the leading edge of the air bearing were broken due to high adhesive forces experienced during take off by the leading edge. However, pads located in the middle portion of the slider and near the trailing edge were not broken and were not substantially worn.

Figure 10:
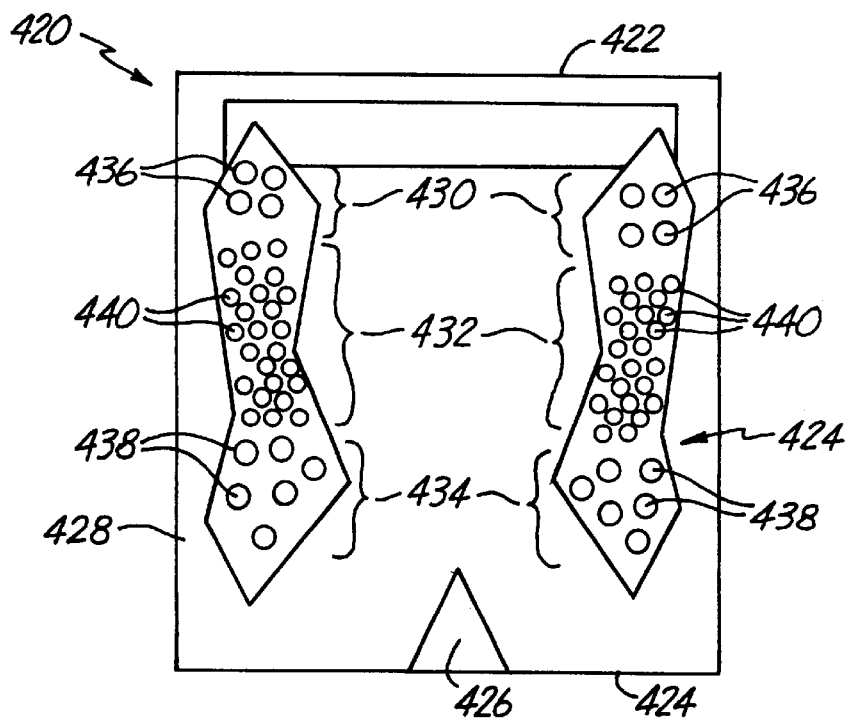
FIG. 10 is a bottom plan view of a slider in accordance with another embodiment of the invention.

FIG. 10 is a bottom plan view of a slider 420 in accordance with another embodiment. Slider 420 includes leading edge 422 and trailing edge 424 having a center island 426 carried thereon. Rails 428 extend along either side of the slider 420. As illustrated in FIG. 10, the rails of slider 420 are divided generally into three sections, a leading section 430, a mid section 432 and a trailing section 434. Leading section 430 carries pads 436 having a relatively large diameter (or area) to provide additional strength and reduce the likelihood of breakage. Similarly, trailing section 434 also carries large size pads 438 to provide additional strength and reduce the possibility of breakage. Mid section 432 carries smaller pads 440 which provide a smaller cross-sectional area which may be optimized to reduce stiction and improve flyability. The increased size of pads 438 also reduces the amount of wear should prolonged contact with media occur during operation.

The pads 436, 438, 440 shown in FIG. 10 may be fabricated using a single masking operation. However, should differing pads be desired, multiple masks may be provided. For example, the leading edge pads may be made higher such that they may sustain more wear without allowing the slider substrate to contact the medium surface which would substantially increase stiction.

Although the present invention has been described with reference to preferred embodiments, workers skilled in the art will recognize that changes may be made in form and detail without departing from the spirit and scope of the invention. In general, the pads may be placed along any protruding portion of the air bearing surface such as the side rails, a center rail, a center island, etc. In general, the present invention includes all of the various sizes, shapes, heights, placings, configurations, densities, etc. of the pads set forth herein. Such pads may be made in accordance with any of the processes set forth herein or may be fabricated using other processes as desired. Similarly, the specific process herein are not limited to fabrication of those pads which have been specifically set forth herein. The invention may be used with any type of transducing element including inductive, magnetoresistive and optical elements. In general, in these designs the pads only contact the disc surface during CSS and do not contact the disc surface during normal flying.

What is claimed is:

1. A disc drive storage system, comprising:
   a rotating disc having a disc surface;
   a transducing head for reading and writing on the disc surface;
   transducing circuitry coupled to the transducing head;
   a slider having rails formed thereon and having an air bearing surface, the slider supporting the transducing head proximate the disc surface; and
   a plurality of pads carried on the rails having an area which contacts the disc surface during contact start/stop (CSS) and a height selected based upon a model and as a function of thickness of a lubricant carried on the disc surface to provide a desired maximum stiction during CSS wherein the slider includes rails on the air bearing surface and wherein a leading edge of each rail includes a single pad, a trailing edge of each rail includes a single pad and a middle portion of each rail contains a plurality of pads.

2. The disc drive storage system of claim 1 wherein the model includes a substantially linear relationship between thickness of the lubricant and stiction between the slider and the disc surface.

3. The disc drive storage system of claim 1 wherein the air bearing surface of the slider includes a plurality of micropores formed in the air bearing surface to cause a hydrodynamic effect on the air bearing surface during operation.

4. The disc drive storage system of claim 1 wherein the pads are distributed over substantially the entire air bearing surface of the slider.

5. The disc drive storage system of claim 1 including:
   a leading edge pad positioned on a rail of the air bearing surface closer to a leading edge of the slider
   a trailing edge pad positioned on the rail of the air bearing surface near a trailing edge of the slider; and
   wherein the leading edge and trailing edge pads have differing heights.

6. The disc drive storage system of claim 1 including:
   a leading edge pad positioned on the air bearing surface closer to a leading edge of the slider;
   a trailing edge pad positioned on the air bearing surface near a trailing edge of the slider; and
   a midsection pad positioned on the air bearing surface between the leading edge pad and the trailing edge pad.

7. The disc drive storage system as in claim 6 wherein the leading, trailing and midsection pads each have a respective height and the height of the midsection pad is less than the height of the leading and trailing pads.

8. The disc drive storage system of claim 1 including:
   a kick pad positioned between a trailing edge of the slider and one of the plurality of pads, the kick pad having a height which is less than the height of the one pad and having a height and a position to limit a pitch angle of the slider.

9. The disc drive storage system of claim 1 wherein the slider includes an air bearing surface having a textured portion formed thereon, the textured portion comprises diamond-like carbon (DLC) including a plurality of particles encapsulated therein to thereby form the texturing.

10. The disc drive storage system of claim 1 including:
    a first landing pad carried on the air bearing surface having a first contact area for contacting the disc surface during CSS; and
    a second landing pad carried on the air bearing surface and positioned between the first landing pad and a leading edge of the slider, the second landing pad having a second contact area configured to contact the disc surface during CSS which is greater than the area of the first landing pad, the second contact area sufficiently large to thereby provide increased strength to the second landing pad and reduce wear of the second landing pad.

11. The disc drive storage system as in claim 1 wherein at least one pad has a convex surface.

12. The disc drive storage system as in claim 1 wherein at least one pad has a concave surface.

13. The disc drive storage system as in claim 1 wherein at least one pad has a square shape.

14. The disc drive storage system as in claim 1 wherein at least one pad has an elliptical shape.

15. The disc drive storage system as in claim 1 wherein at least one pad has a circular shape.

16. The disc drive storage system as in claim 1 wherein at least one pad has a tear drop shape.

17. The disc drive storage system as in claim 1 wherein the slider has two rails each having a leading edge and a trailing edge, further comprising:
    a first pair of pads disposed on rails adjacent the leading edge; and
    a second pair of pads disposed on rails adjacent the trailing edge.

18. The disc drive storage system as in claim 17 wherein the rails each have crowns, further comprising a middle pair of pads disposed between the first and second pairs of pads to reduce contact between disc surface and the crowns.

19. The disc drive storage system as in claim 1 wherein the slider has a leading edge and a trailing edge, and wherein the pads are not distributed adjacent the trailing edge.

20. The disc drive storage system as in claim 1 wherein the slider includes an inner rail and an outer rail defining the air bearing surface, and wherein the pads are positioned differently on the inner rail than on the outer rail.

21. The disc drive storage system as in claim 1 wherein positions of the pads is pre-defined.

22. The disc drive storage system as in claim 1 wherein positions of the pads is random.

23. The disc drive storage system as in claim 1 wherein the pads have a plurality of different heights.

24. The disc drive storage system as in claim 1 wherein the pads have different surface areas.

25. The disc drive storage system as in claim 1 wherein stiction is related to the height of the pads as:

$$S = \mu E a \frac{H-h}{H}$$

where S is stiction, $\mu$ is coefficient of friction, E is the Young's modulus, a is the total surface area of all pads, H is the pad height and h is the head-disc separation at contact.

26. The disc drive storage system as in claim 1 wherein the height of all of the pads is progressively less from a leading edge toward a trailing edge of the slider.

27. A method of fabricating a slider in a disc drive storage system, comprising:
    obtaining a slider having an air bearing surface;
    depositing a mask on the air bearing surface, the mask having an opening formed therein which exposes a portion of the air bearing surface;
    depositing a landing pad layer of material in the opening of the mask wherein the landing pad layer is deposited on an angle; and
    removing the mask from the air bearing surface thereby forming a landing pad from the landing pad material on the air bearing surface.

28. The method of fabricating a slider as in claim 27 wherein the landing pad is deposited anisotropically.

29. The method of fabricating a slider as in claim 27 wherein the anisotropical deposition forms a smooth transition on the air bearing surface.

30. The method of fabricating a slider as in claim 27 wherein the landing pad material comprises DLC.

31. The method of fabricating a slider as in claim 27 including rotating the slider as the landing pad material is deposited.

32. The method of fabricating a slider as in claim 31 wherein the landing pad has a convex surface.

33. The method of fabricating a slider as in claim 31 wherein the landing pad has a concave surface.

34. The method of fabricating a slider as in claim 27 wherein the landing pad has a square shape.

35. The method of fabricating a slider as in claim 27 wherein the landing pad has an elliptical shape.

36. The method of fabricating a slider as in claim 27 wherein the landing pad has a circular shape.

37. The method of fabricating a slider as in claim 27 wherein the landing pad has tear drop shape.

38. A method of fabricating a slider in a disc drive storage system, comprising:

obtaining a slider having an air bearing surface formed of AlTiC;

depositing a mask on the AlTiC air bearing surface, the mask having at least one opening formed therein which exposes a portion of the air bearing surface;

ablating the AlTiC air bearing surface through the opening in the mask to form a plurality of AlTiC pads in the air bearing surface; and removing the mask from the air bearing surface thereby exposing the AlTiC air bearing surface with the AlTiC pad formed thereon;

wherein the pads have different heights.

39. The method of fabricating a slider as in claim 38 wherein the landing pad has a square shape.

40. The method of fabricating a slider as in claim 38 wherein the landing pad has an elliptical shape.

41. The method of fabricating a slider as in claim 38 wherein the landing pad has a circular shape.

42. The method of fabricating a slider as in claim 38 wherein the landing pad has a tear drop shape.

43. The method of fabricating a slider in accordance with claim including forming:

a first pad disposed on the air bearing surface adjacent a leading edge of the slider;

a second pad disposed on the air bearing surface adjacent a trailing edge of the slider; and a middle pad disposed between the first and second pads to eliminate contact between disc surface and a crown of the slider.

44. The method of fabricating a slider as in claim 43 wherein the first, second and middle pads each have a respective height and the height of the middle pad is less than the height of the first and second pads.

45. The method of fabricating a slider as in claim 38 wherein the slider includes an inner rail and an outer rail defining the air bearing surface, and wherein the pads are positioned differently on the inner rail than on the outer rail.

46. The method of fabricating a slider as in claim 45 wherein the inner and outer rails each have a leading edge and a trailing edge, and wherein the pads on the inner rail are positioned closer to the leading edge than the pads on the outer rail.

47. The method of fabricating a slider as in claim 45 wherein the inner and outer rails each have a leading edge and a trailing edge, and wherein the pads on the inner rail are positioned closer to the trailing edge than the pads on the outer rail.

48. The method of fabricating a slider as in claim 38 wherein the position of the pads is pre-defined.

49. The method of fabricating a slider as in claim 38 wherein the position of the pads is random.

50. The method of fabricating a slider as in claim 38 wherein the pads have different surface areas.

51. The method of fabricating a slider as in claim 38 wherein pads having a relatively larger surface area are positioned adjacent a leading edge and pads having a relatively smaller surface area are positioned adjacent a trailing edge of the slider.

52. The method of fabricating a slider as in claim 38 wherein the slider includes rails defining the air bearing surface and wherein a leading edge of each rail includes a single pad, a trailing edge of each rail includes a single pad and a middle portion of each rail contains a plurality of pads.

53. A disc drive storage system, comprising:

a rotating disc having a disc surface;

a transducing head for reading and writing on the disc surface;

transducing circuitry coupled to the transducing head;

a slider having an air bearing surface, the slider supporting the transducing head proximate the disc surface;

a plurality of micro-pores formed in the air bearing surface causing a hydrodynamic effect on the air bearing surface during operation; and at least one pad on the air bearing surface and extending from the air bearing surface in the direction toward the disc surface.

54. The disc drive storage system as in claim 53 wherein the hydrodynamic effect comprises additional lift.

55. The disc drive storage system as in claim 53 wherein the hydrodynamic effect comprises additional damping.

56. The disc drive storage system as in claim 53 wherein the micro-pores have a desired peripheral shape and a desired depth contour to achieve the desired hydrodynamic effect.

57. The disc drive storage system as in claim 56 wherein the peripheral shape is circular.

58. The disc drive storage system as in claim 56 wherein the peripheral shape is square.

59. The disc drive storage system as in claim 56 wherein the peripheral shape is elliptical.

60. The disc drive storage system as in claim 56 wherein the depth contour has a flat bottom.

61. The disc drive storage system as in claim 60 wherein the depth contour has sloped sides.

62. The disc drive storage system as in claim 56 wherein the depth contour has straight sides.

63. The disc drive storage system as in claim 56 wherein the depth contour is V-shaped.

64. The disc drive storage system as in claim 53 including:

a first pad disposed on the air bearing surface adjacent a leading edge of the slider;

a second pad disposed on the air bearing surface adjacent a trailing edge of the slider; and a middle pad disposed between the first and second pads to eliminate contact between disc surface and a crown of the slider.

65. The disc drive storage system as in claim 53 including:

a first pair of pads disposed on rails adjacent the leading edge; and a second pair of pads disposed on rails adjacent the trailing edge.

66. The disc drive storage system as in claim 53 wherein the pad has a convex surface.

67. The disc drive storage system as in claim 53 wherein the pad has a concave surface.

68. The disc drive storage system as in claim 53 wherein the pad has an elliptical shape.

69. The disc drive storage system as in claim 53 wherein the pad has a circular shape.

70. The disc drive storage system as in claim 53 wherein the pad has a tear drop shape.

71. The disc drive storage system as in claim 53 wherein the slider has two rails each having a leading edge and a trailing edge, further comprising:
   a first pair of pads disposed on the rails adjacent the leading edge; and
   a second pair of pads disposed on the rails adjacent the trailing edge.

72. The disc drive storage system as in claim 71 wherein the rails each have crowns, further comprising a middle pair of pads disposed between the first and second pairs of pads to reduce contact between disc surface and the crowns.

73. The disc drive storage system as in claim 53 wherein the slider has a leading edge and a trailing edge, and wherein the pads are not distributed adjacent the trailing edge.

74. The disc drive storage system as in claim 53 wherein the slider includes an inner rail and an outer rail defining the air bearing surface, and wherein the pads are positioned differently on the inner rail than on the outer rail.

75. The disc drive storage system as in claim 74 wherein the inner and outer rails each have a leading edge and a trailing edge, and wherein the pads on the inner rail are positioned closer to the leading edge than the pads on the outer rail.

76. The disc drive storage system as in claim 74 wherein the inner and outer rails each have a leading edge and a trailing edge, and wherein the pads on the inner rail are positioned closer to the trailing edge than the pads on the outer rail.

77. The disc drive storage system as in claim 53 wherein pads having a relatively larger surface area are positioned adjacent a leading edge and pads having a relatively smaller surface area are positioned adjacent a trailing edge.

78. A disc drive storage system, comprising:
   a rotating disc having a disc surface;
   a transducing head for reading and writing on the disc surface;
   transducing circuitry coupled to the transducing head;
   a slider for positioning the transducing head proximate the disc surface, the slider having an air bearing surface generally facing the disc surface for forming an air bearing therebetween;
   a leading edge pad positioned on the air bearing surface closer to the leading edge of the slider;
   a trailing edge pad positioned on the air bearing surface near the trailing edge of the slider; and
   a midsection pad positioned on the air bearing surface between the leading edge pad and the trailing edge pad;
   wherein the pads are carried on rails each have crowns and the midsection pads reduce contact between the disc surface and the crowns.

79. The disc drive storage system as in claim 78 wherein the leading, trailing and middle pads each have a respective height and the height of the middle pad is less than the height of the leading and trailing pads.

80. The disc drive storage system as in claim 78 wherein at least one pad has a convex surface.

81. The disc drive storage system as in claim 78 wherein at least one pad has a concave surface.

82. The disc drive storage system as in claim 78 wherein at least one pad has a square shape.

83. The disc drive storage system as in claim 78 wherein at least one pad has an elliptical shape.

84. The disc drive storage system as in claim 78 wherein at least one pad has a circular shape.

85. The disc drive storage system as in claim 78 wherein at least one pad has a tear drop shape.

86. The disc drive storage system as in claim 78 wherein the slider includes an inner rail and an outer rail defining the air bearing surface, and wherein the pads are positioned differently on the inner rail than on the outer rail.

87. The disc drive storage system as in claim 78 wherein some of the pads have different surface areas.

88. The disc drive storage system as in claim 87 wherein pads having a relatively larger surface area are positioned adjacent a leading edge and pads having a relatively smaller surface area are positioned adjacent a trailing edge.

89. The disc drive storage system as in claim 78 wherein the height of the leading edge pad is greater than and the height of the trailing edge pad.

90. The disc drive storage system as in claim 78 wherein the height of all of the pads is progressively shorter from the leading edge to the trailing edge.

91. The disc drive storage system of claim 78 including a kick pad positioned between a trailing edge of the slider and the landing pad, the kick pad having a height which is less than the height of the land pad and having a height and a position to limit a pitch angle of the slider.

92. The disc drive storage system as in claim 78 including a textured portion.

93. The disc drive storage system as in claim 92 wherein the textured portion includes a plurality of DLC layers and a plurality of small encapsulated particle layers.

94. The disc drive storage system as in claim 78 including:
   a plurality of micro-pores formed in the air bearing surface causing a hydrodynamic effect on the air bearing surface during operation; and
   wherein the micro-pores have a desired peripheral shape and a desired depth contour to achieve the desired hydrodynamic effect.

95. The disc drive storage system as in claim 94 wherein the hydrodynamic effect comprises additional lift.

96. The disc drive storage system as in claim 95 wherein the depth contour is V-shaped.

97. The disc drive storage system as in claim 94 wherein the hydrodynamic effect comprises additional damping.

98. The disc drive storage system as in claim 94 wherein the peripheral shape is circular.

99. The disc drive storage system as in claim 94 wherein the peripheral shape is square.

100. The disc drive storage system as in claim 94 wherein the peripheral shape is elliptical.

101. The disc drive storage system as in claim 94 wherein the depth contour has a flat bottom.

102. The disc drive storage system as in claim 94 wherein the depth contour has sloped sides.

103. The disc drive storage system as in claim 94 wherein the depth contour has straight sides.

104. A disc drive storage system, comprising:
   a rotating disc having a disc surface;
   a transducing head for reading and writing on the disc surface;
   transducing circuitry coupled to the transducing head;
   a slider for positioning the transducing head proximate the air bearing surface, the slider having an air bearing surface generally facing the disc surface for forming an air bearing therebetween;
   a leading edge pad positioned on the air bearing surface closer to the leading edge of the slider;
   a trailing edge pad positioned on the air bearing surface near the trailing edge of the slider; and a midsection pad positioned on the air bearing surface between the leading edge pad and the trailing edge pad;

wherein the leading edge pad and the trailing edge pad have differing heights.

105. The disc drive storage system as in claim 104, wherein the slider includes a crown and the midsection pad is disposed to reduce contact between disc surface and the crown.

106. The disc drive storage system as in claim 104 wherein the leading, trailing and midsection pads each have a respective height and the height of the midsection pad is less than the height of the leading and trailing pads.

107. The disc drive storage system as in claim 104 wherein at least one pad has a convex surface.

108. The disc drive storage system as in claim 104 wherein at least one pad has a concave surface.

109. The disc drive storage system as in claim 104 wherein at least one pad has a square shape.

110. The disc drive storage system as in claim 104 wherein at least one pad has an elliptical shape.

111. The disc drive storage system as in claim 104 wherein at least one pad has a circular shape.

112. The disc drive storage system as in claim 104 wherein at least one pad has a tear drop shape.

113. The disc drive storage system as in claim 104 wherein the slider includes an inner rail and an outer rail defining the air bearing surface, and wherein the pads are positioned differently on the inner rail than on the outer rail.

114. The disc drive storage system as in claim 113 wherein the inner and outer rails each have a leading edge and a trailing edge, and wherein the pads on the inner rail are positioned closer to the leading edge than the pads on the outer rail.

115. The disc drive storage system as in claim 113 wherein the inner and outer rails each have a leading edge and a trailing edge, and wherein the pads on the inner rail are positioned closer to the trailing edge than the pads on the outer rail.

116. The disc drive storage system as in claim 104 wherein pads having a relatively larger surface area are positioned adjacent a leading edge and pads having a relatively smaller surface area are positioned adjacent a trailing edge.

117. The disc drive storage system as in claim 104 including a kick pad positioned between a trailing edge of the slider and a landing pad having a height which is less than a height of the landing pad to limit a pitch angle of the slider.

118. The disc drive storage system as in claim 104 wherein the air bearing surface includes a textured portion formed by applying a DLC layer over a layer of small encapsulated particles.

119. A disc drive storage system, comprising:

a rotating disc having a disc surface;

a transducing head for reading and writing on the disc surface;

transducing circuitry coupled to the transducing head;

a slider having an air bearing surface for supporting the transducing head proximate the disc surface;

at least one leading edge landing pad on the air bearing surface extending in a direction away from the air bearing surface for use during CSS of the slider;

at least one trailing edge landing on the air bearing surface extending in a direction away from the air bearing surface and positioned closer to a trailing edge of the slider than the leading edge landing pad, the trailing edge landing pad having a trailing edge landing pad height for use during CSS of the slider; and a kick pad positioned between the trailing edge of the trailing edge slider and the landing pad, the kick pad having a height which is less than the height of the trailing landing pad and having a position whereby the kick pad does not touch the disc surface when the slider is landed and configured to limit a pitch angle of the slider when the slider is flying.

120. The disc drive storage system as in claim 119 the slider including a textured portion formed thereon and wherein the textured portion comprises diamond-like carbon (DLC) including a plurality of particles encapsulated therein to thereby form the texturing.

121. The disc drive storage system as in claim 120 wherein the textured portion comprises a landing pad.

122. The disc drive storage system as in claim 119 including:

a plurality of micro-pores formed in the air bearing surface causing a hydrodynamic effect on the air bearing surface during operation; and wherein the micro-pores have a desired peripheral shape and a desired depth contour to achieve the desired hydrodynamic effect.

123. The disc drive storage system as in claim 122 wherein the peripheral shape is circular.

124. The disc drive storage system as in claim 122 wherein the peripheral shape is square.

125. The disc drive storage system as in claim 122 wherein the peripheral shape is elliptical.

126. The disc drive storage system as in claim 122 wherein the depth contour has a flat bottom.

127. The disc drive storage system as in claim 122 wherein the depth contour has sloped sides.

128. The disc drive storage system as in claim 122 wherein the depth contour is V-shaped.

129. The disc drive storage system as in claim 119 including:

a middle pad disposed between the leading and trailing edge landing pads to eliminate contact between disc surface and the crown.

130. The disc drive storage system as in claim 129 wherein the leading, trailing and middle pads each have a respective height and the height of the middle pad is less than the height of the first and second pads.

131. The disc drive storage system as in claim 119 wherein at least one pad has a convex surface.

132. The disc drive storage system as in claim 119 wherein at least one pad has a concave surface.

133. The disc drive storage system as in claim 119 wherein at least one pad has an elliptical shape.

134. The disc drive storage system as in claim 119 wherein at least one pad has a circular shape.

135. The disc drive storage system as in claim 119 wherein at least one pad has a tear drop shape.

136. The disc drive storage system as in claim 119 wherein the slider includes an inner rail and an outer rail defining the air bearing surface, and wherein pads are positioned differently on the inner rail than on the outer rail.

137. The disc drive storage system as in claim 136 wherein the inner and outer rails each have a leading edge and a trailing edge, and wherein the pads on the inner rail are positioned closer to the leading edge than the pads on the outer rail.

138. The disc drive storage system as in claim 136 wherein the inner and outer rails each have a leading edge and a trailing edge, and wherein the pads on the inner rail are positioned closer to the trailing edge than the pads on the outer rail.

139. The disc drive storage system as in claim 119 wherein the pads have different surface areas.

140. The disc drive storage system as in claim 119 wherein pads having a relatively larger surface area are positioned adjacent a leading edge and pads having a relatively smaller surface area are positioned adjacent a trailing edge.

141. The disc drive storage system as in claim 119 wherein the height of all of the pads is progressively shorter from the leading edge to the trailing edge.

142. A disc drive storage system, comprising:

a rotating disc having a disc surface;

a transducing head for reading and writing on the disc surface;

transducing circuitry coupled to the transducing head;

a slider for positioning the transducing head proximate the disc surface, the slider including an air bearing surface having a textured portion formed thereon;

wherein the textured portion comprises diamond-like carbon (DLC) including a plurality of particles encapsulated therein to thereby form the texturing; and wherein the textured portion comprises a landing pad.

143. The disc drive storage system as in claim 142 wherein the textured portion formed by applying a DLC layer over a layer of small encapsulated particles.

144. The disc drive storage system as in claim 142 wherein the textured portion comprises multiple DLC layers.

145. The disc drive storage system as in claim 142 wherein the particles comprise silicon dioxide.

146. The disc drive storage system as in claim 142 wherein the particles are between 3 nm and 20 nm below a surface of the DLC.

147. The disc drive storage system as in claim 142 wherein the particles provide height variations of between about 0.1 and 10 microinches.

148. The disc drive storage system as in claim 142 including adhesion layer to adhere the DLC to the slider.

149. The disc drive storage system as in claim 142 wherein the landing pad has a square shape.

150. The disc drive storage system as in claim 142 wherein the landing pad has an elliptical shape.

151. The disc drive storage system as in claim 142 wherein the landing pad has a circular shape.

152. The disc drive storage system as in claim 142 wherein the landing pad has tear drop shape.

153. The disc drive storage system as in claim 142 including:

a plurality of micro-pores formed in the air bearing surface causing a hydrodynamic effect on the air bearing surface during operation; and wherein the micro-pores have a desired peripheral shape and a desired depth contour to achieve the desired hydrodynamic effect.

154. The disc drive storage system as in claim 152 wherein the peripheral shape is circular.

155. The disc drive storage system as in claim 142 including:

a first pad disposed on the air bearing surface adjacent a leading edge of the slider;

a second pad disposed on the air bearing surface adjacent a trailing edge; and a middle pad disposed between the first and second pads to reduce contact between disc surface and a crown of the slider.

156. The disc drive storage system as in claim 142 wherein the slider has two rails each having a leading edge and a trailing edge, further comprising:

a first pair of pads disposed on rails adjacent the leading edge; and a second pair of pads disposed on rails adjacent the trailing edge.

157. The disc drive storage system as in claim 142 wherein the slider includes an inner rail and an outer rail defining the air bearing surface, and wherein textured pads are positioned differently on the inner rail than on the outer rail.

158. The disc drive storage system as in claim 142 wherein the position of the pads is pre-defined.

* * * * *

UNITED STATES PATENT AND TRADEMARK OFFICE
CERTIFICATE OF CORRECTION

PATENT NO. : 6,212,042 B1
DATED : April 3, 2001
INVENTOR(S) : Jing Gui et al.

It is certified that error appears in the above-identified patent and that said Letters Patent is hereby corrected as shown below:

Title page,
Item [60], Related U.S. Application Data,
change "60/074,958" to -- 60/074,968 --.

Column 18,
Line 14, delete "and".
Line 22, change "land" to -- landing --.

Column 21,
Line 25, after "portion" insert -- is --.

Column 22,
Line 15, change "152" to -- 1553 --.

Signed and Sealed this

Eighteenth Day of December, 2001

*Attest:*

*Attesting Officer*

JAMES E. ROGAN
*Director of the United States Patent and Trademark Office*